United States Patent
Hollis

(10) Patent No.: US 11,804,992 B2
(45) Date of Patent: Oct. 31, 2023

(54) ASYMETRIC DECISION FEEDBACK EQUALIZATION

(71) Applicant: Micron Technology, Inc., Boise, ID (US)

(72) Inventor: Timothy M. Hollis, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 69 days.

(21) Appl. No.: 17/225,602

(22) Filed: Apr. 8, 2021

(65) Prior Publication Data

US 2022/0329464 A1 Oct. 13, 2022

(51) Int. Cl.
*H04L 25/03* (2006.01)
*H04L 25/02* (2006.01)
*H04L 1/00* (2006.01)
*H04L 1/1607* (2023.01)

(52) U.S. Cl.
CPC ...... *H04L 25/03267* (2013.01); *H04L 1/0041* (2013.01); *H04L 1/0045* (2013.01); *H04L 1/1678* (2013.01); *H04L 25/028* (2013.01); *H04L 25/0292* (2013.01)

(58) Field of Classification Search
CPC ............ H04L 25/03267; H04L 1/0047; H04L 25/0292; H04L 25/028; H04L 1/0041; H04L 1/0045
USPC ................................ 375/229, 232–233, 316
See application file for complete search history.

(56) References Cited

U.S. PATENT DOCUMENTS

| | | | | |
|---|---|---|---|---|
| 5,677,801 A | * | 10/1997 | Fukuchi | G11B 27/36 360/68 |
| 5,790,335 A | * | 8/1998 | Sugawara | H03K 5/082 360/68 |
| 7,616,133 B2 | | 11/2009 | Hollis | |
| 7,720,654 B2 | | 5/2010 | Hollis | |
| 7,869,494 B2 | | 1/2011 | Hollis | |
| 7,936,812 B2 | | 5/2011 | Hollis | |
| 8,102,906 B2 | | 1/2012 | Hollis | |
| 8,271,239 B2 | | 9/2012 | Hollis | |
| 8,401,135 B2 | * | 3/2013 | Beukema | H04L 27/01 375/350 |
| 8,406,356 B2 | | 3/2013 | Hollis | |
| 8,923,380 B1 | * | 12/2014 | Malhotra | H04L 25/03057 375/232 |
| 9,014,318 B2 | | 4/2015 | Hollis | |
| 9,444,588 B1 | * | 9/2016 | Katic | H04L 25/03057 |
| 9,474,034 B1 | * | 10/2016 | Baumgartner | H04W 24/08 |
| 9,860,087 B1 | * | 1/2018 | Francese | H04L 25/03057 |
| 10,164,805 B1 | | 12/2018 | Hollis | |
| 10,491,365 B1 | * | 11/2019 | Lin | H04L 43/028 |
| 10,523,473 B2 | | 12/2019 | Hollis | |
| 2008/0304557 A1 | | 12/2008 | Hollis | |
| 2009/0010320 A1 | | 1/2009 | Hollis | |
| 2009/0092180 A1 | | 4/2009 | Hollis | |

(Continued)

*Primary Examiner* — Emmanuel Bayard
(74) *Attorney, Agent, or Firm* — Fletcher Yoder, P.C.

(57) ABSTRACT

Systems and methods for implementation of modified decision feedback equalization. In one embodiment, a method, includes sweeping a reference voltage signal across a set of voltages to find a center point of an eye diagram, determining whether an asymmetry is present in the eye diagram relative to the center point of the eye diagram, and when an asymmetry is determined to be present, generating a control signal to select a mode of decision feedback equalization to be applied to an input data bit.

23 Claims, 10 Drawing Sheets

(56) References Cited

U.S. PATENT DOCUMENTS

| | | |
|---|---|---|
| 2011/0099682 A1 | 4/2011 | Hollis |
| 2012/0155529 A1* | 6/2012 | Mangaser ......... H04L 25/03878 375/233 |
| 2013/0230089 A1 | 9/2013 | Hollis |
| 2018/0097665 A1* | 4/2018 | Li ........................... H04L 69/28 |
| 2020/0396109 A1* | 12/2020 | Peng .................... H04L 25/061 |

* cited by examiner

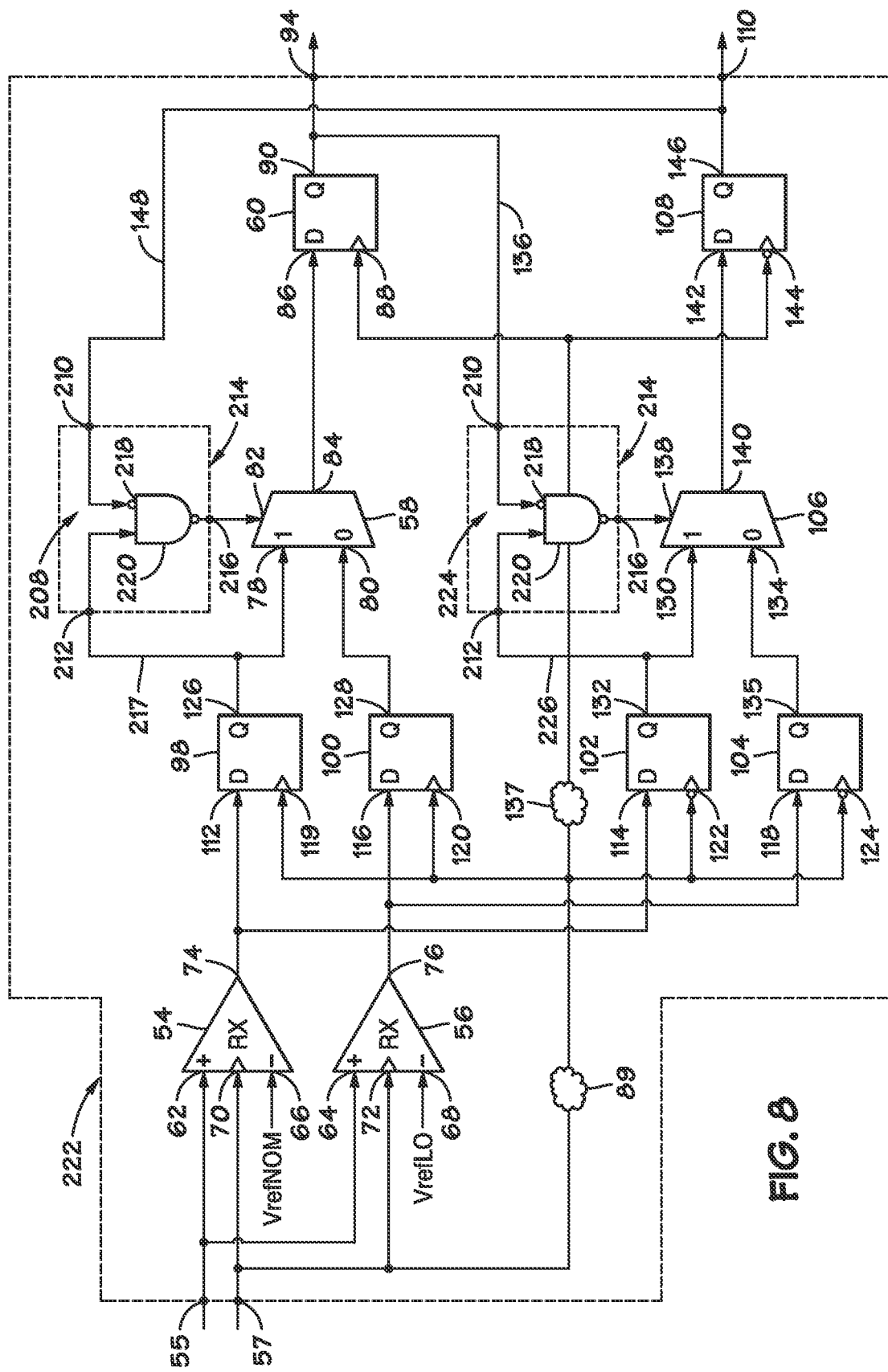

# ASYMETRIC DECISION FEEDBACK EQUALIZATION

BACKGROUND

Field of the Invention

Embodiments of the present disclosure relate generally to the field of semiconductor memory devices. More specifically, embodiments of the present disclosure relate to selectively use a decision feedback equalizer (DFE) circuit of a semiconductor memory device to correct distortions in transmitted signals.

Description of the Related Art

The operational rate of memory devices, including the data rate of a memory device, has been increasing over time. As a side effect of the increase in speed of a memory device, data errors due to distortion may increase. For example, inter-symbol interference between transmitted data whereby previously received data influences the currently received data may occur (e.g., previously received data affects and interferes with subsequently received data). One manner to correct for this interference is through the use of a decision feedback equalizer (DFE) circuit, which may be programmed to offset (i.e., undo, mitigate) the effect of the channel on the transmitted data.

Additionally, correcting distortions in the transmitted signals continues to be important. However, conventional distortion correction techniques may not adequately correct the distortions of the signal. Errors that result from conventional distortion correction techniques when applied in particular environments cause additional distortions to the final data, thus reducing the reliability of data transmitted within the memory devices.

BRIEF DESCRIPTION OF THE DRAWINGS

Various aspects of this disclosure may better be understood upon reading the following detailed description and upon reference to the drawings in which:

FIG. 8 illustrates a third embodiment of a decision feedback equalizer of the decision feedback equalizer circuitry of FIG. 2, according to an embodiment of the present disclosure;

DETAILED DESCRIPTION

Figure 1:
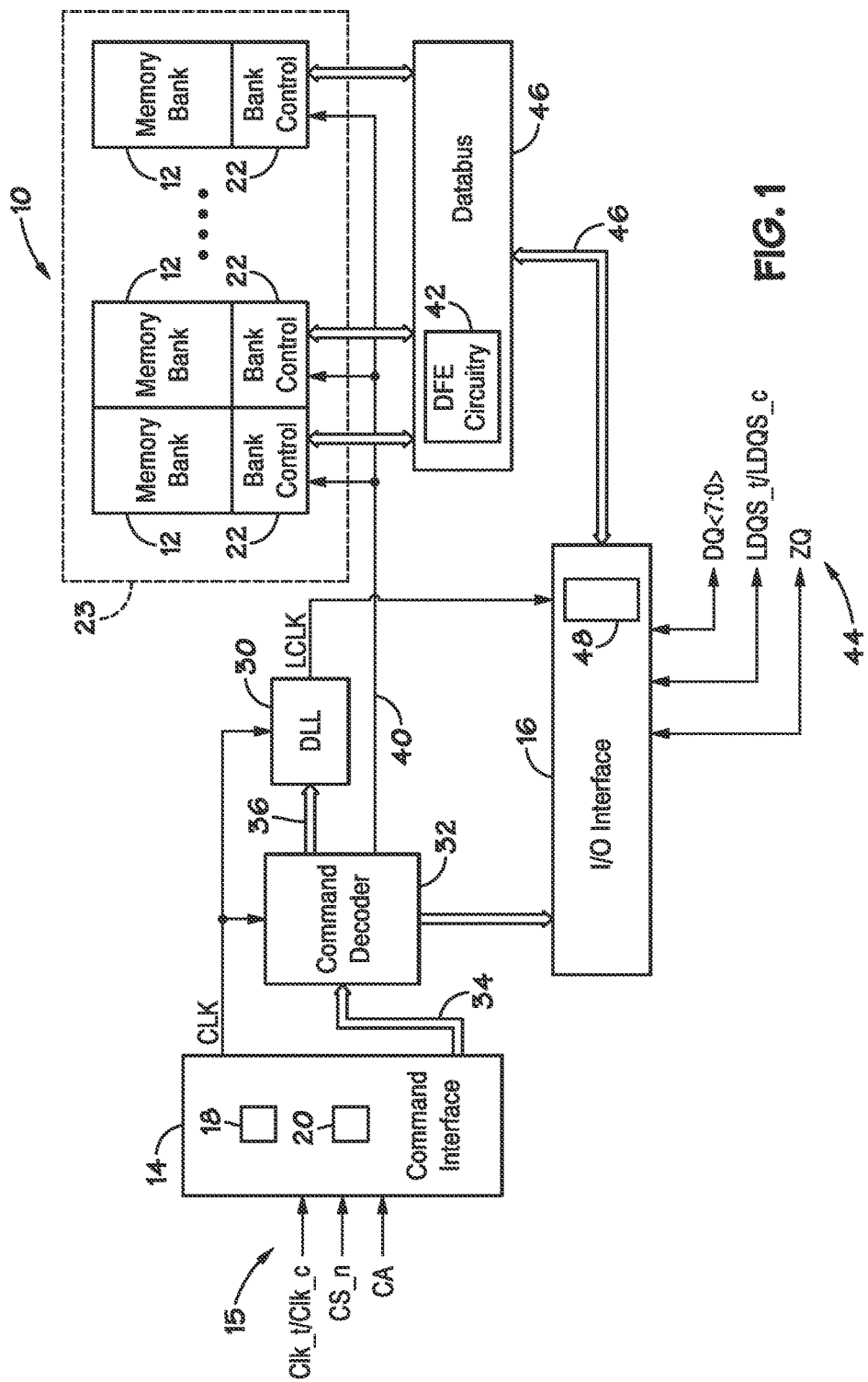
FIG. 1 is a simplified block diagram illustrating certain features of a memory device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Using a feedback equalizer (DFE) of a memory device (or in other locations, for example, on a non-memory side of a channel of the memory device that receives data from the memory device or in one or more electronic chips that utilize an N/N memory driver, a low-voltage source-terminated logic (LVSTL), or other N/N style drivers) to perform distortion correction techniques may be valuable. For example, in the memory context, the DFE may be useful to correctly compensate for distortions in the received data of the memory device. This ensures that accurate values are being stored in the memory of the memory device. The DFE may use previous bit data to create corrective values to compensate for distortion resulting from the immediately preceding bit data. For example, the most recent previous bit may have more of a distortion effect on the current bit than a bit transmitted several data bits previously (e.g., which may be described as unit intervals (UI) or bit times/periods), causing the corrective values to be different between the two bits. With these levels to correct for, the DFE may operate to correct the distortion of the transmitted bit.

Accordingly, the present disclosure relates to a decision feedback equalizer (DFE) that utilizes of one or multiple bits of previous data in order to output a generated signal that is generated based on a comparison between an input signal and an offset reference signal. In some embodiments, the DFE may correct for a distortion factor by selecting an offset reference voltage that is compared to the current bit based on one or more previous bits. However, in some environments, there may be an asymmetric response when portions of a memory device (e.g., a memory driver) switch from a logical low (i.e., "0") signal to a logical high (e.g., "1") signal or when portions of the memory device (e.g., the memory driver) switch from a logical high signal to a logical low signal. This may cause issues for the proper operation of the DFE.

Accordingly, in some embodiments, DFE circuitry is described that compensates for asymmetric responses of memory device when switching logic states. Additional embodiments include determination of whether asymmetric responses for a particular memory element and/or memory device occur and if so, whether the asymmetric response occurs during a logical high transition (e.g., from a logical low signal to a logical high signal) or whether the asymmetric response occurs during a logical low transition (e.g., from a logical high signal to a logical low signal). The DFE circuitry can be programmed to operate with no adjustment, an adjustment to compensate for an asymmetric response occurring during a logical high, or an asymmetric response occurring during a logical low transition.

Turning now to the figures, FIG. 1 is a simplified block diagram illustrating certain features of a memory device 10. Specifically, the block diagram of FIG. 1 is a functional block diagram illustrating certain functionality of the memory device 10. In accordance with one embodiment, the memory device 10 may be a random access memory (RAM) device, a dynamic RAM (DRAM) device, a static RAM (SRAM) device (including a double data rate SRAM device), flash memory, or a double data rate type four synchronous dynamic random access memory (DDR4 SDRAM) device, a double data rate type five synchronous dynamic random access memory (DDR4 SDRAM) device. In other embodiments, the memory device 10 may be or may include a low power memory device, such as a low power double data rate (LPDDR) synchronous dynamic random access memory (SRAM) device of various types. These types may include, among others, a type four For example, a low power double data rate type four synchronous dynamic random access memory (LPDDR4 SDRAM or LPDDR4×SDRAM), a low power double data rate type five synchronous dynamic random access memory (LPDDR5 SDRAM), or other types of low power memory devices.

The memory device 10, may include a number of memory banks 12. The memory banks 12 may be LPDDR5 SDRAM memory banks, for instance. The memory banks 12 may be provided on one or more chips (e.g., SDRAM chips) that are arranged on dual inline memory modules (DIMMS). Each DIMM may include a number of SDRAM memory chips (e.g., ×8 or ×16 memory chips), as will be appreciated. Each SDRAM memory chip may include one or more memory banks 12. The memory device 10 represents a portion of a single memory chip (e.g., SDRAM chip) having a number of memory banks 12. It should be appreciated that various other configurations, organization and sizes of the memory banks 12 on the memory device 10 may be utilized depending on the application and design of the overall system and the type of memory employed.

The memory device 10 may include a command interface 14 and an input/output (I/O) interface 16 configured to exchange (e.g., receive and transmit) signals with external devices. The command interface 14 is configured to provide a number of signals (e.g., signals 15) from an external device (not shown), such as a processor or controller (e.g., a memory controller). The processor or controller may provide various signals 15 to the memory device 10 to facilitate the transmission and receipt of data to be written to or read from the memory device 10.

As will be appreciated, the command interface 14 may include a number of circuits, such as a clock input circuit 18 and a command address input circuit 20, for instance, to ensure proper handling of the signals 15. The command interface 14 may receive one or more clock signals from an external device. Generally, double data rate (DDR) memory utilizes a differential pair of system clock signals, referred to herein as the true clock signal (Clk_t) and the complementary clock signal (Clk_c). The positive clock edge for DDR refers to the point where the rising true clock signal Clk_t crosses the falling complementary clock signal Clk_c, while the negative clock edge indicates that transition of the falling true clock signal Clk_t and the rising of the complementary clock signal Clk_c. Commands (e.g., read command, write command, etc.) are typically entered on the positive and negative clock edges and data is transmitted or received on both the positive and negative clock edges.

The clock input circuit 18 receives the true clock signal (Clk_t) and the complementary clock signal (Clk_c) and generates an internal clock signal CLK. The internal clock signal CLK is supplied to an internal clock generator 30, such as a delay locked loop (DLL) circuit. The internal clock generator 30 generates a phase controlled internal clock signal LCLK based on the received internal clock signal CLK. The phase controlled internal clock signal LCLK is supplied to the I/O interface 16, for instance, and is used as a timing signal for determining an output timing of read data.

The internal clock signal CLK may also be provided to various other components within the memory device 10 and may be used to generate various additional internal clock signals. For instance, the internal clock signal CLK may be provided to a command decoder 32. The command decoder 32 may receive command signals from the command bus 34 and may decode the command signals to provide various internal commands. For instance, the command decoder 32 may provide command signals to the internal clock generator 30 over the bus 36 to coordinate generation of the phase controlled internal clock signal LCLK. The phase controlled internal clock signal LCLK may be used to clock data through the I/O interface 16, for instance.

Further, the command decoder 32 may decode commands, such as read commands, write commands, mode-register set commands, activate commands, etc., and provide access to a particular memory bank 12 corresponding to the command, via the bus path 40. As will be appreciated, the memory device 10 may include various other decoders, such as row decoders and column decoders, to facilitate access to the memory banks 12. In one embodiment, each memory bank 12 includes a bank control block 22 which provides the necessary decoding (e.g., row decoder and column decoder), as well as other features, such as timing control and data control, to facilitate the execution of commands to and from the memory banks 12. Collectively, the memory banks 12 and the bank control blocks 22 may be referred to as a memory array 23.

The memory device 10 executes operations, such as read commands and write commands, based on the command/address signals received from an external device, such as a processor. In one embodiment, the command/address bus may be a 14-bit bus to accommodate the command/address signals (CA). The command/address signals are clocked to the command interface 14 using the clock signals (Clk_t and Clk_c). The command interface may include a command address input circuit 20 which is configured to receive and transmit the commands to provide access to the memory banks 12, through the command decoder 32, for instance. In addition, the command interface 14 may receive a chip select signal (CS_n). The CS_n signal enables the memory device 10 to process commands on the incoming CA bus. Access to specific banks 12 within the memory device 10 is encoded on the CA bus with the commands. In addition, the command interface 14 may be configured to receive a number of other command signals and other memory types may employ different signals received by the command interface 14.

Data may be sent to and from the memory device 10, utilizing the command and clocking signals discussed above, by transmitting and receiving data signals 44 through the I/O interface 16. More specifically, the data may be sent to or retrieved from the memory banks 12 over the data bus 46, which includes a plurality of bi-directional data buses. Data I/O signals, generally referred to as DQ signals, are generally transmitted and received in one or more bi-directional data busses. Additionally present is a decision feedback equalizer (DFE) circuitry 42. In some embodiments, the DFE circuitry 42 may include a buffer that stores a number (e.g., one or more) of previous bits (e.g., each having a high or low value) that may be used to interpret incoming data bits in the data I/O signals (i.e., the DQ signals). The DFE circuitry 42 utilizes the previous levels in the DQ signals to increase accuracy of interpreting incoming bits in the DQ signals.

While the DFE circuitry 42 is illustrated in the data bus 46, in some embodiments, it may instead or additionally be disposed in the bank control block 22, the I/O interface 16, for example, adjacent to or as part of a data transceiver 48 of the I/O interface 16, or in another location of the memory device 10. In some embodiments, the data transceiver 48 may include a DQ connector or other input, a DQ transceiver, and a serializer/deserializer that operates to translate serial data bits (e.g., a serial bit stream) into a parallel data bits (e.g., a parallel bit stream) for transmission along data bus 46 during data write operations of the memory device 10. Likewise, more than one data transceiver 48 may be present in the I/O interface 16.

Additionally, to allow for higher data rates within the memory device 10, certain memory devices, such as LPDDR memory devices may utilize data strobe signals, generally referred to as DQS signals. The DQS signals are driven by the external processor or controller sending the data (e.g., for a write command) or by the memory device 10 (e.g., for a read command). For read commands, the DQS signals are effectively additional data output (DQ) signals with a predetermined pattern. For write commands, the DQS signals are used as clock signals to capture the corresponding input data. As with the clock signals (Clk_t and Clk_c), the data strobe (DQS) signals may be provided as a differential pair of data strobe signals (DQS_t and DQS_c) to provide differential pair signaling during reads and writes.

An impedance (ZQ) calibration signal may also be provided to the memory device 10 through the I/O interface 16. The ZQ calibration signal may be provided to a reference pin and used to tune output drivers and on die termination (ODT) values by adjusting pull-up and pull-down resistors of the memory device 10 across changes in process, voltage and temperature (PVT) values. Because PVT characteristics may impact the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 10 and GND/VSS external to the memory device 10. This resistor acts as a reference for adjusting internal ODT and drive strength of the I/O pins.

As will be appreciated, various other components such as power supply circuits (for receiving external VDD and VSS signals), mode registers (to define various modes of programmable operations and configurations), read/write amplifiers (to amplify signals during read/write operations), temperature sensors (for sensing temperatures of the memory device 10), etc., may also be incorporated into the memory device 10. Accordingly, it should be understood that the block diagram of FIG. 1 is only provided to highlight certain functional features of the memory device 10 to aid in the subsequent detailed description.

In some embodiments, the memory device 10 may be disposed in (physically integrated into or otherwise connected to) a host device or otherwise coupled to a host device. The host device may include any one of a desktop computer, laptop computer, pager, cellular phone, personal organizer, portable audio player, control circuit, camera, etc. The host device may also be a network node, such as a router, a server, or a client (e.g., one of the previously-described types of computers). The host device may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The host device may, thus, be a processor-based device, which may include a processor, such as a microprocessor, that controls the processing of system functions and requests in the host. Further, any host processor may comprise a plurality of processors that share system control. The host processor may be coupled directly or indirectly to additional system elements of the host, such that the host processor controls the operation of the host by executing instructions that may be stored within the host or external to the host.

In some embodiments, the memory drivers that are used to drive signals (e.g., DO signals) to the memory elements of the memory bank 12 may be utilized in the memory device. These memory drivers may include, for example, an NMOS transistor as a pull-up transistor and an NMOS transistor as a pull down transistor (i.e., an N/N memory driver, a low-voltage source-terminated logic (LVSTL), or other N/N style drivers). Use of these types of memory drivers may lead to asymmetric behaviors (including a reduced rate of change in voltage), for example, when transitioning from a logical low (i.e., "0") signal to a logical high (e.g., "1") signal or vice versa, for example, due to differences in the linearity between the pull-down transistor and the pull-up transistor. Likewise, when the memory device 10 incorporates, for example, multi-rank loading (i.e., more than one memory element or bank 12 is coupled to a common channel), the memory device 10 can benefit from decision feedback equalization. However, when asymmetries are present in the voltages that accompany a logical low transition and a logical high transition, decision feedback equalization can be hampered and its effectiveness may be reduced.

Figure 2:
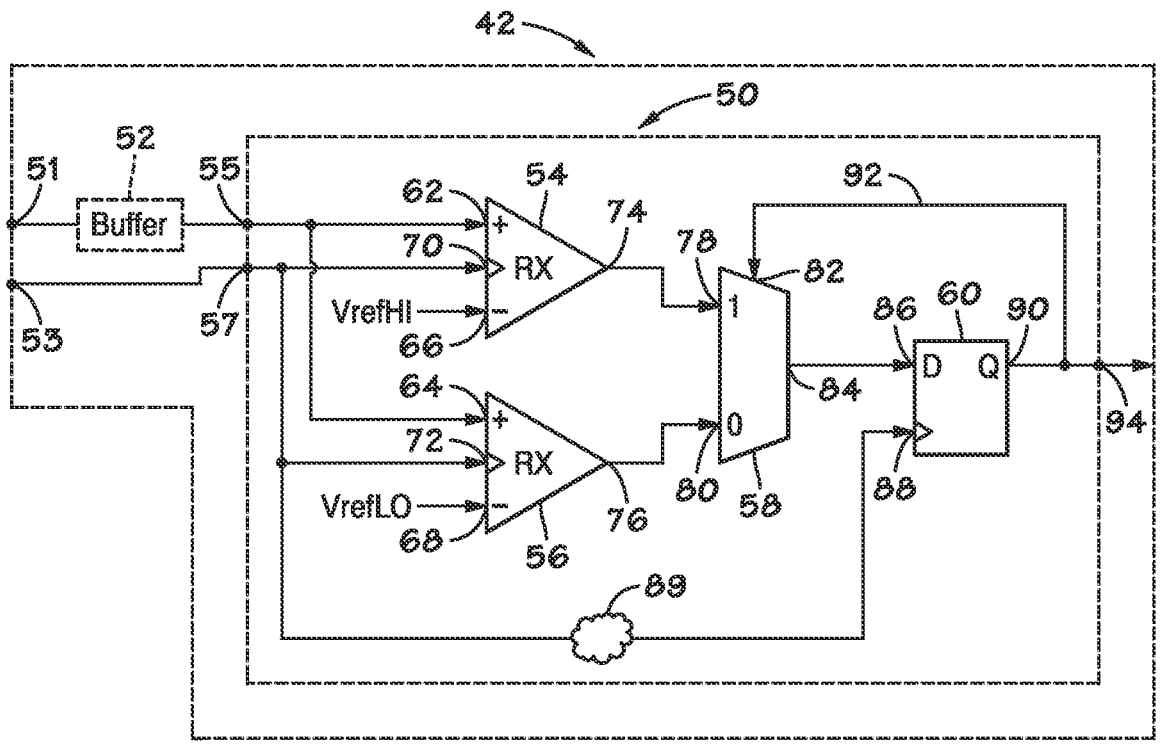
FIG. 2 illustrates a block diagram of the decision feedback equalizer circuitry of the memory device of FIG. 1, according to an embodiment of the present disclosure.

At least in some instances, data transmitted through the memory device 10 and received by a memory bank 12 may be distorted due to a value of a previous bit. For example, the data received at the memory bank 12 may be distorted relative to data transmitted by the host. One technique to mitigate (e.g., offset or cancel) this distortion and to effectively reduce the distortion is to apply an equalization operation, such as via decision feedback equalization. FIG. 2 illustrates an embodiment of the DFE circuitry 42 that may be utilized in an equalization operation. As illustrated, the DFE circuitry 42 includes a decision feedback equalizer (DFE) 50. Additionally, the DFE circuitry 42 may, in some embodiments, include a buffer 52. The buffer 52 may operate as a cache to store incoming DQ data (received from input 51 of the DFE circuitry 42, which may be a pin, a connector, or the like) from which bits (e.g., Din bits) may be transmitted to respective DFEs 50 when, for example, more than one DFE 50 is employed, for example, in parallel with one another. This will allow for greater throughput, as each DFE 50 may equalize its respectively received Din bit (e.g., a first DFE 50 can operate on and equalize a first bit of DQ signals, a second DFE 50 can operate on and equalize a second bit of DQ signals, a third DFE 50 can operate on and equalize a third bit of DQ signals, a fourth DFE 50 can operate on and equalize a fourth bit of DQ signals, and the process can repeat with the first DFE 50 operating on and equalizing a fifth bit of DQ signals, etc.).

The DFE circuitry 42 may further include an input 53, which may be a pin, a connector, or the like and may operate to receive: a clock signal (e.g., DQS). Furthermore, as illustrated in FIG. 2, the DFE 50 is a full-rate single tap DFE 50 that clocks on every edge of a received clock signal. Moreover, it should be noted that in other embodiments, more than one tap may be utilized in conjunction with the DFE 50. Taps in the DFE 50 corresponds to the number of bits of previous data (in order) used to precisely select the bit value of the current bit (i.e., a distortion correction factor). For example, previously transmitted bits are fed back and used to select which of a plurality of reference voltages are used in a comparison to determine the state (e.g., binary high or binary low) of a current bit. In some embodiments, when multiple taps are utilized, the taps that correspond to the most recent previously received data (e.g., bit n−1) may have a stronger influence on selection of the comparison voltage used when determining the state of the received data than bits received at earlier times (e.g., bits n−1, n−2, and n−3).

The illustrated embodiment of the DFE 50 includes a receiver 54 (e.g., a comparator), a receiver 56 (e.g., a comparator), a selection circuit 58 (e.g., a multiplexer), and a latch 60 (e.g., flip-flop). The DFE may also include input 55 that operates to receive signals (e.g., Din bits) and an input 57 that operates to receive a clock signal (e.g., DQS). Each of input 55 and input 53 may be a pin, a connector, or the like and in some embodiments may be coupled to respective inputs 51 and 53 (e.g., input 55 can be directly coupled to input 51 or coupled via buffer 52 when it is present) or inputs 55 and 57 may be eliminated and the signals received at inputs 51 and 53 may be transmitted to the DFE 50.

In general operation, the DFE 50 receives input bits (e.g., Din) at input 55 and generates corrected bits (e.g., Dout) for transmission at output 94 (e.g., a pin, connector, or the like). The corrected bits have either a logical high state or a logical low state as determined based partially on the value of at least one previously corrected bit, as discussed in more detail below.

More specifically, an input bit is transmitted to input 62 of receiver 54 and input 64 of receiver 56. Additionally, receiver 54 receives a reference voltage (VrefHi) at input 66 of the receiver 54 while receiver 56 receives a reference voltage (VrefLo) at input 68 of the receiver 56. The VrefHi at input 66 may have a higher voltage than the voltage of VrefLo at input 68. Each of the receivers 54 and 56 also receive the clock signal (e.g., DQS) at input 70 and input 72, respectively, from input 57. The clock signal may be generated internal to the DFE circuitry 42, internal to the memory device 10, or may be generated external to the memory device 10 and transmitted to the memory device 10, e.g., in conjunction with transmitted data. Thus, there are many circuits from which the clock signal may be presented to input 70 and input 72. In operation, the receiver 54 compares the voltage of the input bit (e.g., Din) against the reference voltage VrefHi when a clock is received at input 70. Likewise, when the same clock signal is received at input 72, the receiver 56 compares the voltage of the input bit (e.g., Din) against the reference voltage VrefLo.

When the voltage of the input bit is recognized to be greater than the reference voltage VrefHi, a result signal corresponding to a logical high signal (e.g., "1") having, for example, a predetermined voltage value is generated by the receiver 54. Likewise, when the voltage of the input bit is recognized to be less than the reference voltage VrefHi, a result signal corresponding to a logical low signal (e.g., "0") having, for example, a second predetermined voltage value is generated by the receiver 54. The result signal generated by the receiver 54 is transmitted from an output 74 of the receiver 54 to, for example, input 78 of the selection circuit 58.

Similarly, when the voltage of the input bit is recognized to be greater than the reference voltage VrefLo, a result signal corresponding to a logical high signal (e.g., "1") having, for example, a predetermined voltage value is generated by the receiver 56. Likewise, when the voltage of the input bit is recognized to be less than the reference voltage VrefLo, a result signal corresponding to a logical low signal (e.g., "0") having, for example, a second predetermined voltage value is generated by the receiver 56. The values for the VrefLo and/or the VrefHi may be provided by a band gap reference, a Digital-to-Analog Converter (DAC), a resistor-based voltage divider network, and the like. The result signal generated by the receiver 56 is transmitted from an output 76 of the receiver 56 to, for example, input 80 of the selection circuit 58.

The selection circuit 58 may operate to selectively transmit one of the result signals received at its input 78 or its input 80. In operation, this selection may be determined based upon the value of a signal received at a control input 82 of the selection circuit 58. For example, when the signal received at the control input 82 corresponds to a logical low signal, the result signal received at input 80 is transmitted as a selected signal from the output 84 of the selection circuit 58 to an input 86 of the latch 60. Conversely, when the signal received at the control input 82 corresponds to a logical high signal, the result signal received at input 78 is transmitted from the output 84 of the selection circuit 58 as the selected signal to an input 86 of the latch 60. Latch 60 may also include an input 88 that receives the clock signal, which may be delayed, for example, via a timing delay circuit 89. The clock signal received at input 88 can be utilized to clock the outputting of the result signal received at input 86 at a particular time (i.e., in conjunction with the clock signal) via output 90 of the latch 60 as an output signal (or signal) Dout. As additionally, illustrated, this output signal Dout is transmitted as a feedback signal to the selection circuit 58 via path 92 to the control input 82 so that the signal transmitted from output 90 can be used as the control signal for selection of the result signal received at input 78 or input 80. In this manner, the output signal Dout operates as a selection signal for the next received input bit Din and decision feedback equalization is thereby applied, as the value of the current output signal Dout is used to properly construe the value a next received input bit Din (i.e., to counteract influences on the currently received bit from the previously received bit, now output signal Dout). The output signal Dout is also transmitted from output 94 of the DFE 50 (as well as from, for example, the DFE circuitry 42) as an equalized signal.

Figure 3:
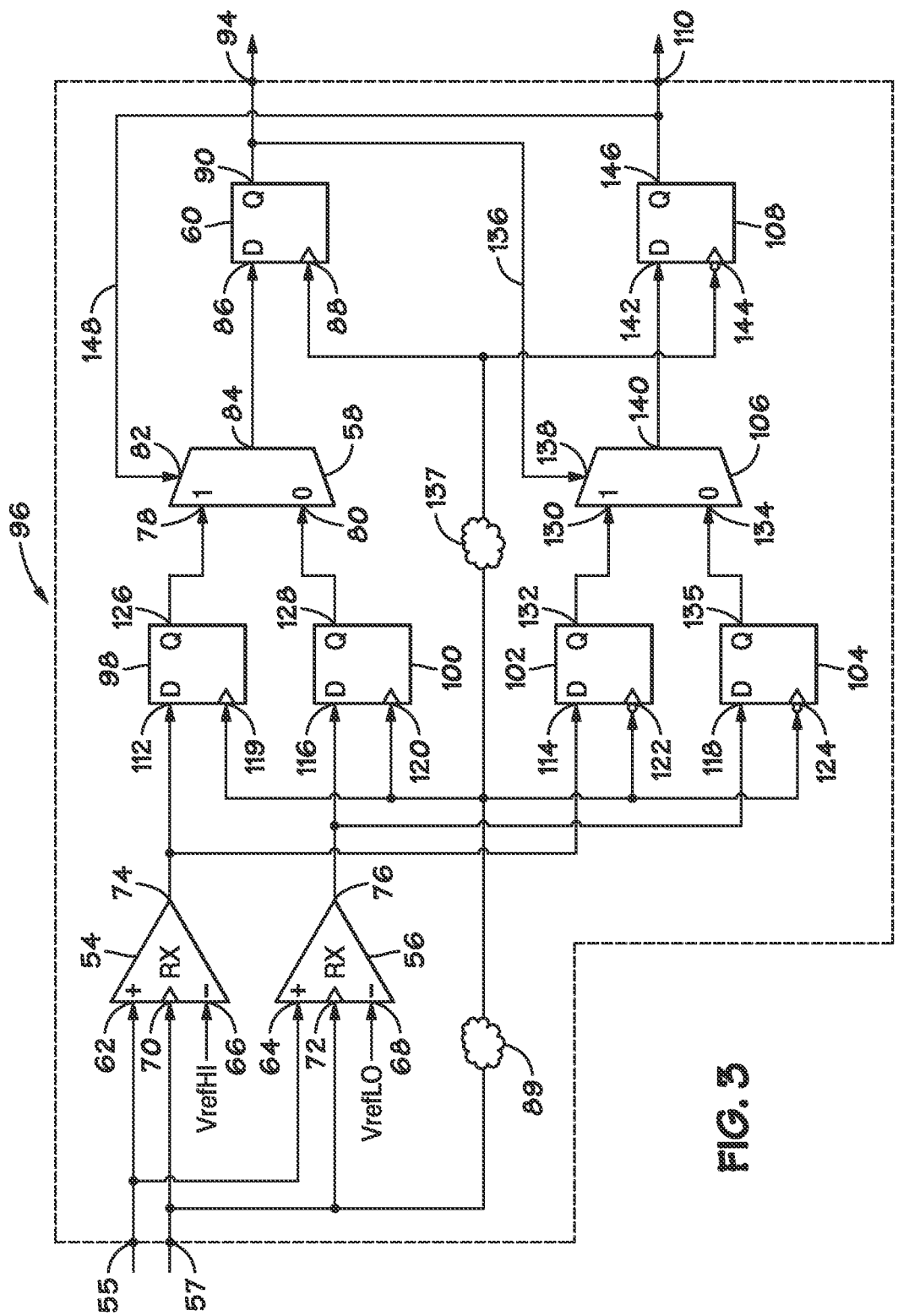
FIG. 3 illustrates an embodiment of a decision feedback equalizer of the decision feedback equalizer circuitry of FIG. 2, according to an embodiment of the present disclosure.

FIG. 3 illustrates an additional embodiment of a DFE 96 in place of the DFE 50. As illustrated, the DFE 96 is a single tap DFE that clocks on every other edge of a received clock signal (i.e., a half-rate single tap DFE 96). Moreover, it should be noted that in other embodiments, more than one tap may be utilized in conjunction with the DFE 96. Similar to DFE 50, the DFE 96 includes a receiver 54 (e.g., a comparator), input 55, a receiver 56 (e.g., a comparator), input 57, a selection circuit 58 (e.g., a multiplexer), a latch 60 (e.g., flip-flop), and an output 94. Additionally, the DFE 96 includes latch 98, latch 100, latch 102, latch 104, selection circuit 106, latch 108, and output 110.

In general operation, the DFE 96 receives input bits (e.g., Din) at input 55 and generates corrected bits (e.g., Dout) for transmission at output 94 and output 110 (e.g., a pin, connector, or the like). The corrected bits have either a logical high state or a logical low state as determined based partially on the value of at least one previously corrected bit, as discussed in more detail below. Furthermore, as described herein, the output 94 will transmit odd bits of Dout (i.e., the first, third, fifth, etc.) while the output 110 will transmit the even bits of Dout (i.e., the second, fourth, sixth, etc.).

More specifically, an input bit is transmitted to input 62 of receiver 54 and input 64 of receiver 56. Additionally, receiver 54 receives a reference voltage (VrefHi) at input 66 of the receiver 54 while receiver 56 receives a reference voltage (VrefLo) at input 68 of the receiver 56. The VrefHi at input 66 may have a higher voltage than the voltage of VrefLo at input 68. Each of the receivers 54 and 56 also receive the clock signal (e.g., DQS) at input 70 and input 72, respectively, from input 57. In operation, the receiver 54 compares the voltage of the input bit (e.g., Din) against the reference voltage VrefHi when a clock is received at input 70. Likewise, when the same clock signal is received at input 72, the receiver 56 compares the voltage of the input bit (e.g., Din) against the reference voltage VrefLo.

When the voltage of the input bit is recognized to be greater than the reference voltage VrefHi, a result signal corresponding to a logical high signal (e.g., "1") having, for example, a predetermined voltage value is generated by the receiver 54. Likewise, when the voltage of the input bit is recognized to be less than the reference voltage VrefHi, a result signal corresponding to a logical low signal (e.g., "0") having, for example, a second predetermined voltage value is generated by the receiver 54. The result signal generated by the receiver 54 is transmitted from an output 74 of the receiver 54.

Similarly, when the voltage of the input bit is recognized to be greater than the reference voltage VrefLo, a result signal corresponding to a logical high signal (e.g., "1") having, for example, a predetermined voltage value is generated by the receiver 56. Likewise, when the voltage of the input bit is recognized to be less than the reference voltage VrefLo, a result signal corresponding to a logical low signal (e.g., "0") having, for example, a second predetermined voltage value is generated by the receiver 56. The values for the VrefLo and/or the VrefHi may be provided by a band gap reference, a Digital-to-Analog Converter (DAC), a resistor-based voltage divider network, and the like. The result signal generated by the receiver 56 is transmitted from an output 76 of the receiver 56.

The result signal transmitted from output 74 of the receiver 54 is transmitted to input 112 of latch 98 and to input 114 of latch 102. Likewise, the result signal transmitted from output 76 of the receiver 56 is transmitted to input 116 of latch 100 and to input 118 of latch 104. Latch 98 and latch 100 each receive the clock signal (DQS) at input 119 and input 120, respectively (which may be delayed, for example, via the timing delay circuit 89). Latch 102 and latch 104 each receive the clock signal (DQS) at input 122 and input 124, respectively (which are inverted inputs) and the DQS signal may be delayed, for example, via the timing delay circuit 89. Latch 98 and latch 100 transmit their respectively received result signal (from input 112 and input 116, respectively) when the clock signal is on a rising edge and/or at a high logical value. In contrast, latch 102 and latch 104 transmit their respectively received result signal (from input 114 and input 118, respectively) when the clock signal is on a falling edge and/or at a logical low value.

Thus, a clocked result signal is transmitted from latch 98 to input 78 of the selection circuit 58 from output 126 of the latch 98 and a clocked result signal is transmitted from latch 100 to input 80 of the selection circuit 58 from output 128 of the latch 98 in response to a positive clock signal or a rising clock edge. Likewise, a clocked result signal is transmitted from latch 102 to input 130 of the selection circuit 106 from output 132 of the latch 102 and a clocked result signal is transmitted from latch 104 to input 134 of the selection circuit 106 from output 135 of the latch 104 in response to a negative clock signal or a falling clock edge.

The selection circuit 58 may operate to selectively transmit one of the result signals received at its input 78 or its input 80. In operation, this selection may be determined based upon the value of a signal received at a control input 82 of the selection circuit 58. For example, when the signal received at the control input 82 corresponds to a logical low signal, the result signal received at input 80 is transmitted as a selected signal from the output 84 of the selection circuit 58 to an input 86 of the latch 60. Conversely, when the signal received at the control input 82 corresponds to a logical high signal, the result signal received at input 78 is transmitted from the output 84 of the selection circuit 58 as the selected signal to an input 86 of the latch 60. Latch 60 may also include an input 88 that receives the clock signal, which may be delayed, for example, via a timing delay circuit 137. The clock signal received at input 88 can be utilized to clock the outputting of the result signal received at input 86 at a particular time (i.e., in conjunction with the clock signal) via output 90 of the latch 60 as an output signal Dout. As additionally illustrated, this output signal is transmitted a feedback signal to the selection circuit 106 via path 136 to a control input 138 of the selection circuit 106 so that the signal transmitted from the output 90 can be used as the control signal for selection of the result signal received at input 130 or input 134. In this manner, the output signal Dout operates as a selection signal for the next received input bit Din and decision feedback equalization is thereby applied, as the value of the current output signal Dout is used to properly construe the value a next received input bit Din (i.e., to counteract influences on the currently received bit from the previously received bit, now output signal Dout). The output signal Dout is also transmitted from output 94 of the DFE 96 (as well as from, for example, the DFE circuitry 42) as an equalized signal for odd bits of Dout.

Similarly, the selection circuit 106 may operate to selectively transmit one of the result signals received at its input 130 or its input 134. In operation, this selection may be determined based upon the value of a signal received at a control input 138 of the selection circuit 106. For example, when the signal received at the control input 138 corresponds to a logical low signal, the result signal received at input 134 is transmitted as a selected signal from the output 140 of the selection circuit 106 to an input 142 of the latch 108. Conversely, when the signal received at the control input 138 corresponds to a logical high signal, the result signal received at input 130 is transmitted from the output 140 of the selection circuit 106 as the selected signal to an input 142 of the latch 108. Latch 108 may also include an input 144 that receives the clock signal, which may be delayed, for example, via a timing delay circuit 137. The clock signal received at input 144 can be utilized to clock the outputting of the result signal received at input 142 at a particular time (i.e., in conjunction with the a negative edge of the clock signal or when the clock signal is a logical low value) via output 146 of the latch 108 as an output signal Dout.

As additionally illustrated, this output signal is transmitted as a feedback signal to the selection circuit 58 via path 148 to a control input 82 of the selection circuit 58 so that the signal transmitted from the output 146 can be used as the control signal for selection of the result signal received at input 78 or input 80. In this manner, the output signal Dout operates as a selection signal for the next received input bit Din and decision feedback equalization is thereby applied, as the value of the current output signal Dout is used to properly construe the value a next received input bit Din (i.e., to counteract influences on the currently received bit from the previously received bit, now output signal Dout). The output signal Dout is also transmitted from output 110 of the DFE 96 (as well as from, for example, the DFE circuitry 42) as an equalized signal for even bits of Dout. It should be noted that additional clocking rates can be accomplished, for example, quarter-rate DFE as part of the DFE circuitry 42 and that these implementations can be utilized.

Figure 4:
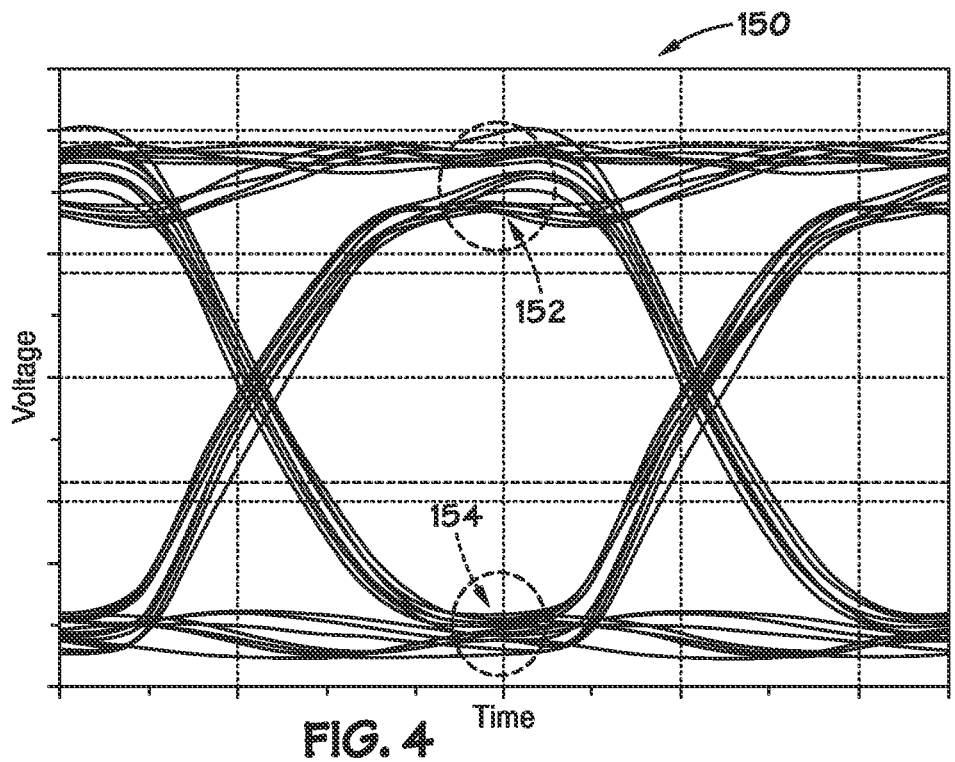
FIG. 4 illustrates an eye diagram generated for a memory element of the memory device of FIG. 1, according to an embodiment of the present disclosure.

In some embodiments, the distortion to the received data bit may be asymmetric. That is, the received data input (e.g., Din) may be distorted when a logic value of the previous bit differs from the logic value of the received data bit. For example, if the previous bit had a logic value of 0 and a current data bit has a logic value of 1, the current data bit may be more distorted, which could cause the current data bit to be incorrectly read as a logic value of 0. It is presently recognized that, certain low power memory devices may experience an asymmetric distortion to received data bit due to, for example, differences in the pull-up and pull down transistors of the memory drivers in the low power memory devices. For example, memory drivers that include an NMOS transistor as a pull-up transistor and an NMOS transistor as a pull down transistor (i.e., an N/N memory driver) may exhibit asymmetric behaviors (including a reduced rate of change in voltage), for example, when transitioning from a logical low (i.e., "0") signal to a logical high (e.g., "1") signal or vice versa, for example, due to differences in the linearity between the pull-down transistor and the pull-up transistor. FIG. 4 illustrates an example of these asymmetries, whereby an eye diagram 150 illustrates a voltage change from a logical low to a logical high as being represented by an eye height 152 that is lower than the eye height 154 that illustrates a voltage change from a logical high to a logical low.

Figure 5:
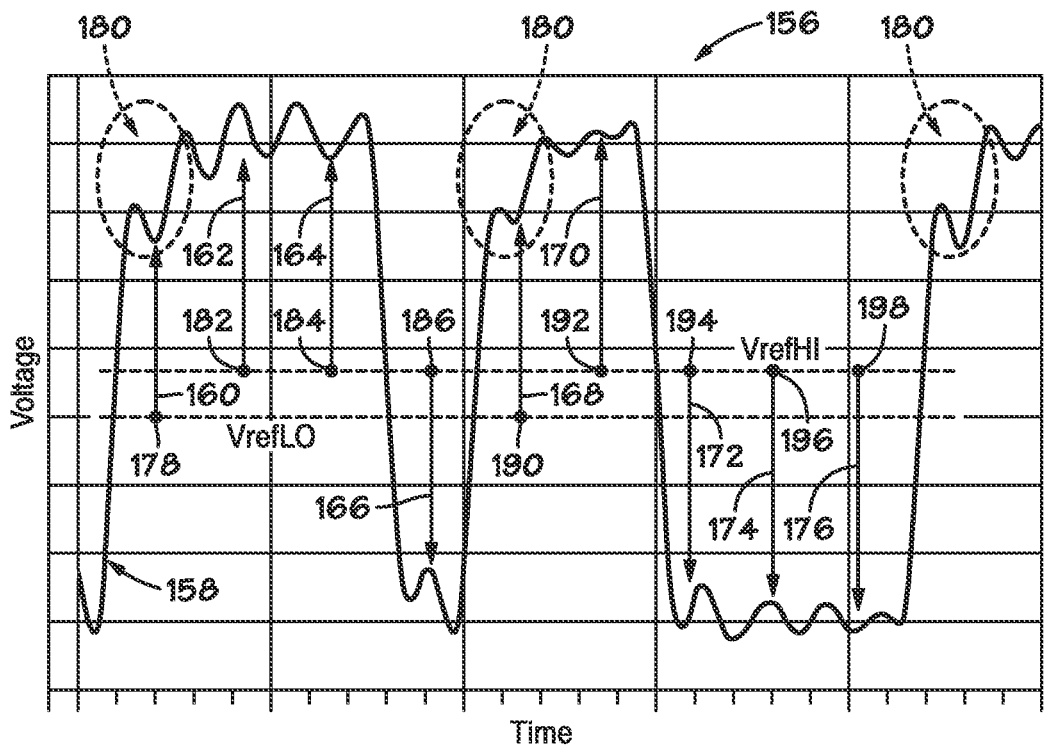
FIG. 5 illustrates a graph of a waveform representing input bits undergoing equalization utilizing a decision feedback equalizer of the decision feedback equalizer circuitry of FIG. 2, according to an embodiment of the present disclosure.

FIG. 5 illustrates a graph 156 of a waveform 158 representing a series of Din bits as well as an equalization 160, an equalization 162, an equalization 164, an equalization 166, an equalization 168, an equalization 170, an equalization 172, an equalization 174, and an equalization 176 each respectively applied to the sequence of Din input bits by, for example, the DFE 50 (or the DFE 96). The equalization 160, equalization 162, equalization 164, equalization 166, equalization 168, equalization 170, equalization 172, equalization 174, and equalization 176 each represent individual equalizations of a decision feedback equalization process with a prior corrected bit (e.g., Dout) being a feedback signal in the DFE 50 (or DFE 96) for use in selection of the logical state of the current input bit Din, as described above with respect to FIGS. 2 and 3.

Thus, as illustrated in graph 156, at time 178, the prior corrected bit Dout is a logical low, so the current input bit Din (logical high) will be selected as having had its voltage compared against the reference voltage VrefLo. The voltage margin (i.e., the distance between the reference voltage applied, here, VrefLo and the voltage at time 178, represented by voltage 180 is aided by use of the equalization 160 due to the asymmetric response in transitioning from a logical low signal to a logical high signal. That is, by using a lower reference voltage VrefLo (rather than, for example, a single reference voltage for both low-to-high and high-to-low logical transitions), the equalization 160 generates improvements in the correct determination of the logical state of the input bit Din, as the voltage margin represented by voltage 180 is increased to offset the asymmetric behavior of, for example, the memory driver.

At time 182 and time 184, the respective equalization 162 and equalization 164 occur whereby the prior corrected bit Dout is a logical high, so the current input bit Din will be selected as having had its voltage compared against the reference voltage VrefHi. The voltage level of the input bit Din at time 182 and at time 184 is higher than the voltage 180 and represent sufficient voltage margin with respect to the reference voltage VrefHi when selected via the equalization 162 and the equalization 164. This is in conformity with the eye diagram 150 of FIG. 4, whereby that eye height 152 corresponding to time 178 is lower than an eye height represented by a previous bit being logical high and a current bit being logical high, which correspond to time 182 and time 184.

Returning to FIG. 5, equalization 166 occurs at time 186, whereby the prior corrected bit Dout is a logical high and the current input bit Din (logical low) will be selected as having had its voltage compared against the reference voltage VrefHi. Equalization 168 occurs at time 190, whereby the prior corrected bit Dout is a logical low and the current input bit Din (logical high) will be selected as having had its voltage compared against the reference voltage VrefLo, similar to the manner described above with respect to equalization 160. Equalization 170 occurs at time 192, whereby the prior corrected bit Dout is a logical high and the current input bit Din (logical high) will be selected as having had its voltage compared against the reference voltage VrefHi, similar to the manner described above with respect to equalization 162.

Equalization 172 occurs at time 194, whereby the prior corrected bit Dout is a logical high and the current input bit Din (logical low) will be selected as having had its voltage compared against the reference voltage VrefHi, similar to the manner described above with respect to equalization 166. Thereafter, at time 196, equalization 174 occurs, whereby the prior corrected bit Dout is a logical low, so the current input bit Din will be selected as having had its voltage compared against the reference voltage VrefLo. The voltage level of the input bit Din at time 196 corresponds to a logical low and the equalization 174 applied at time 196 operates to reduce the voltage margin between the reference voltage VrefLo and the voltage of the input bit Din (since a more accurate selection can be made with respect to the reference voltage VrefHi, as performed at time 194, as it applies a higher reference voltage level and, accordingly, provides a larger voltage margin). The equalization 176 at time 198 has the same potential issue as the equalization 174 at time 196, namely a reduction in the voltage margin that would otherwise be available if equalization were not applied at time 198 (i.e., if the reference voltage VrefHi were applied in place of the VrefLo reference voltage, as determined by the equalization mode applied).

Accordingly, in some embodiments, it may be desirable to eliminate situations such as those discussed above at time 196 and time 198. That is, for example, when a memory driver has asymmetries from low-to-high logic transitions that limit the voltage swing during the transition, equalization using a low reference voltage can be applied to that transition (and vice versa for asymmetries from high-to-low logic transitions). All other equalizations can be performed using a second reference voltage, VrefNom, having a voltage value higher than the voltage value of VrefLo.

In some embodiments, VrefNom may be selected as a nominal voltage that maximizes the voltage margins for both of the input bit Din having a logical high state and the input bit Din having a logical low state (e.g., VrefNom may be selected as having a voltage equal to approximately the midpoint between the voltage of the input bit Din at time 182 and the voltage of the input bit Din at time 196). Alternatively, the value of VrefNom may be selected as having another value (albeit one greater than the voltage value of VrefLo), for example, by a user or selected as a predetermined value based on, for example, the physical characteristics of the memory drivers used and/or the memory elements of the memory bank 12. In other embodiments, for example, VrefLo=VrefNom−offset, whereby offset is the DFE tap value. Additionally, when a memory driver has asymmetries from high-to-low logic transitions that limit the voltage swing during the transition, equalization using the VrefNom can be applied to that transition and all other equalizations can be performed VrefLo. An example of the technique of selective VrefLo application when a memory driver has asymmetries from low-to-high logic transitions that limit the voltage swing during the transition is illustrated in FIG. 6.

Figure 6:
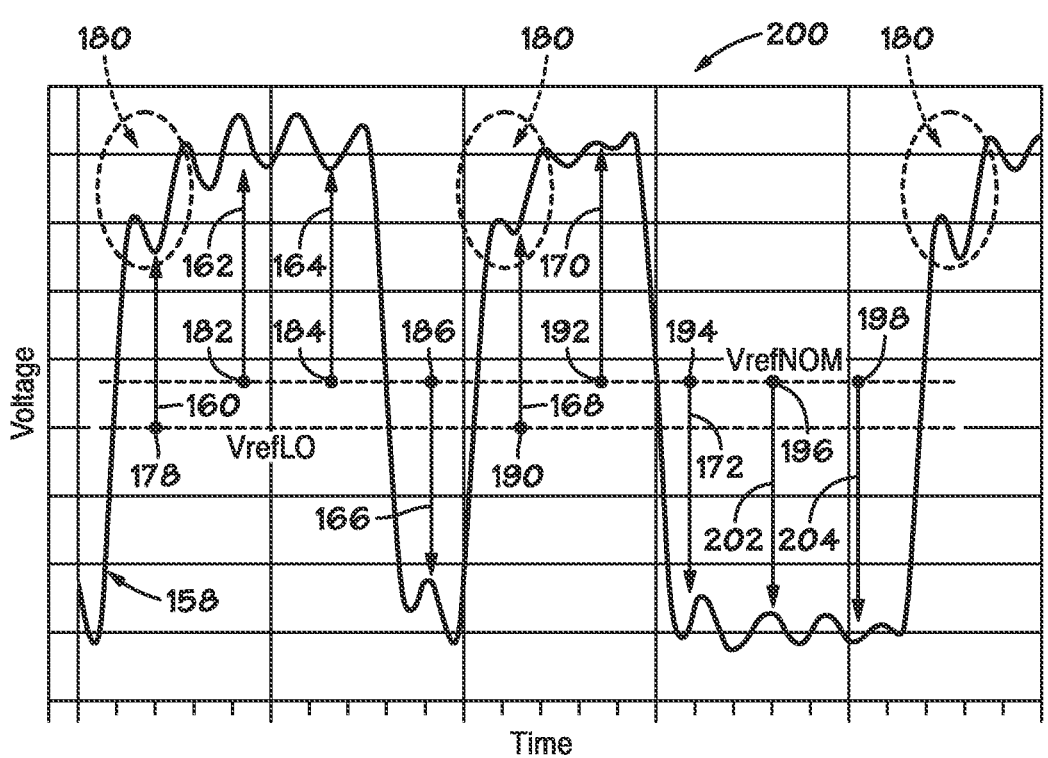
FIG. 6 illustrates a second graph of a waveform representing input bits undergoing equalization utilizing a decision feedback equalizer of the decision feedback equalizer circuitry of FIG. 2, according to an embodiment of the present disclosure.

FIG. 6 illustrates a graph 200 of a waveform 158 representing a series of Din bits as well as equalization 160, equalization 162, equalization 164, equalization 166, equalization 168, equalization 170, equalization 172, an equalization 202, and an equalization 204 each respectively applied to the sequence of Din input bits by, for example, a modified decision feedback equalizer, such as will be discussed in greater detail below with respect to FIGS. 7-10. The equalization 160, equalization 162, equalization 164, equalization 166, equalization 168, equalization 170, equalization 172, equalization 202, and equalization 204 each represent a prior corrected bits (e.g., Dout) being feedback to a control circuit that outputs a selection signal used to control, for example, one (or more) selection circuits of a modified DFE, in contrast to the DFE 50 (or DFE 96) for use in selection of the logical state of the current input bit Din, as described above with respect to FIGS. 2 and 3.

As illustrated, the equalization 160, equalization 162, equalization 164, equalization 166, equalization 168, equalization 170, and equalization 172 occur in a manner similar to that discussed above with respect to FIG. 5 (with a respective higher reference voltage VrefNom being used in a manner similar to VrefHi and VrefLo being the same as described above with respect to FIG. 5). However, equalization 202 and equalization 204 differ from equalization 172 and equalization 174 of FIG. 5 in that the reference voltage used to compare against the input bit Din at time 196 and time 198 is not the lower reference voltage (i.e., VrefLo), but rather the higher reference voltage (VrefNom). This leads to a larger voltage margin between the reference voltage VrefNom and the voltage of the input bit Din relative to equalization 174 and equalization 176. This increase in margin can provide, for example, a more accurate determination of the logical state of the Din input bit.

Figure 7:
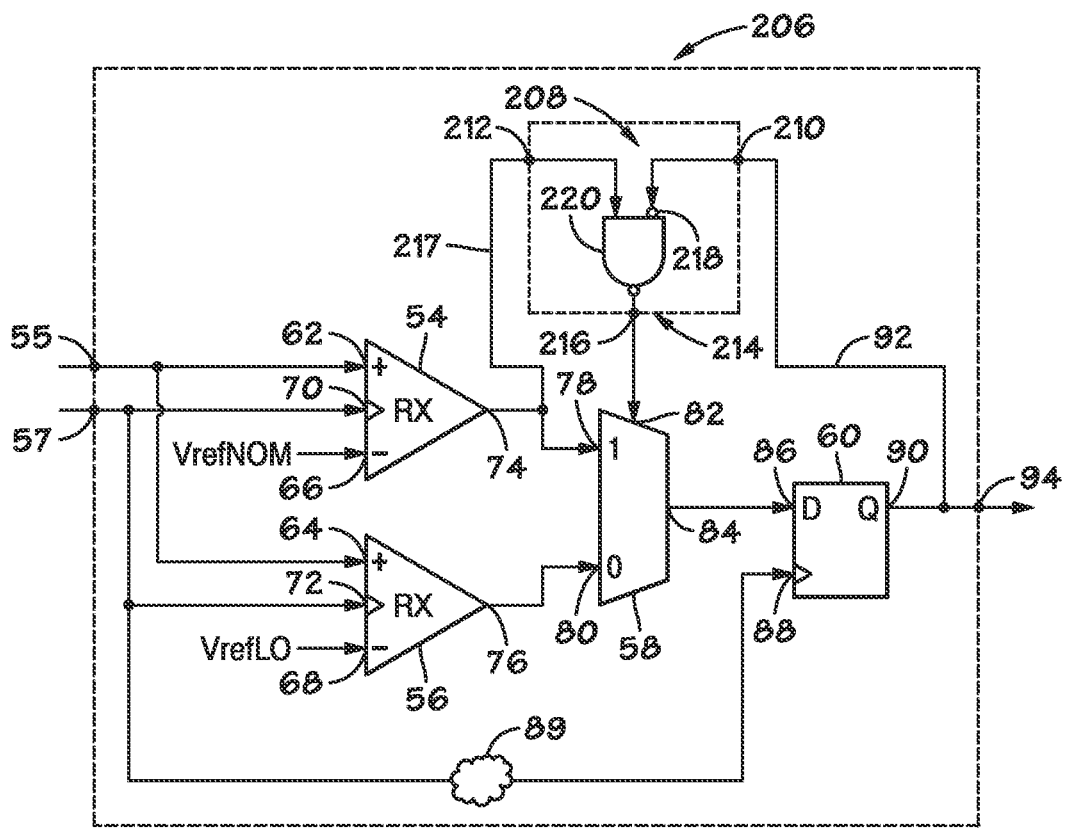
FIG. 7 illustrates a second embodiment of a decision feedback equalizer of the decision feedback equalizer circuitry of FIG. 2, according to an embodiment of the present disclosure.

FIG. 7 illustrates an additional embodiment of a DFE 206 in place of the DFE 50 (and the DFE 96) that can operate to implement the equalization technique described above with respect to FIG. 6 (e.g., a modified decision feedback equalization mode). The DFE 206 is similar to the DFE 50, in that it is a single tap DFE 206 that clocks on every edge of a received clock signal. Moreover, it should be noted that in other embodiments, more than one tap may be utilized in conjunction with the DFE 206. Taps in the DFE 206 corresponds to the number of bits of previous data (in order) used to precisely select the bit value of the current bit (i.e., a distortion correction factor).

The illustrated embodiment of the DFE 206 includes a receiver 54 (e.g., a comparator), a receiver 56 (e.g., a comparator), a selection circuit 58 (e.g., a multiplexer), and a latch 60 (e.g., flip-flop). The DFE may also include input 55 that operates to receive signals (e.g., Din bits) and an input 57 that operates to receive a clock signal (e.g., DQS). Each of input 55 and input 53 may be a pin, a connector, or the like and in some embodiments may be coupled to respective inputs 51 and 53 (e.g., input 55 can be directly coupled to input 51 or coupled via buffer 52 when it is present) or inputs 55 and 57 may be eliminated and the signals received at inputs 51 and 53 may be transmitted to the DFE 206.

In general operation, the DFE 206 receives input bits (e.g., Din) at input 55 and generates corrected bits (e.g., Dout) for transmission at output 94 (e.g., a pin, connector, or the like). The corrected bits have either a logical high state or a logical low state as determined based partially on the value of at least one previously corrected bit as determined by the value of the corrected bit and the input bit, as discussed in more detail below.

More specifically, an input bit is transmitted to input 62 of receiver 54 and input 64 of receiver 56. Additionally, receiver 54 receives a reference voltage (VrefNom) at input 66 of the receiver 54 while receiver 56 receives a reference voltage (VrefLo) at input 68 of the receiver 56. The VrefNom at input 66 may have a higher voltage than the voltage of VrefLo at input 68 (as discussed above with respect to FIG. 6). Each of the receivers 54 and 56 also receive the clock signal (e.g., DQS) at input 70 and input 72, respectively, from input 57. In operation, the receiver 54 compares the voltage of the input bit (e.g., Din) against the reference voltage VrefNom when a clock is received at input 70. Likewise, when the same clock signal is received at input 72, the receiver 56 compares the voltage of the input bit (e.g., Din) against the reference voltage VrefLo.

When the voltage of the input bit is recognized to be greater than the reference voltage VrefNom, a result signal corresponding to a logical high signal (e.g., "1") having, for example, a predetermined voltage value is generated by the receiver 54. Likewise, when the voltage of the input bit is recognized to be less than the reference voltage VrefNom, a result signal corresponding to a logical low signal (e.g., "0") having, for example, a second predetermined voltage value is generated by the receiver 54. The result signal generated by the receiver 54 is transmitted from an output 74 of the receiver 54 to, for example, input 78 of the selection circuit 58.

Similarly, when the voltage of the input bit is recognized to be greater than the reference voltage VrefLo, a result signal corresponding to a logical high signal (e.g., "1") having, for example, a predetermined voltage value is generated by the receiver 56. Likewise, when the voltage of the input bit is recognized to be less than the reference voltage VrefLo, a result signal corresponding to a logical low signal (e.g., "0") having, for example, a second predetermined voltage value is generated by the receiver 56. The values for the VrefLo and/or the VrefNom may be provided by a band gap reference, a Digital-to-Analog Converter (DAC), a resistor-based voltage divider network, and the like. The result signal generated by the receiver 56 is transmitted from an output 76 of the receiver 56 to, for example, input 80 of the selection circuit 58.

The selection circuit 58 may operate to selectively transmit one of the result signals received at its input 78 or its input 80. In operation, this selection may be determined based upon the value of a signal received at a control input 82 of the selection circuit 58. For example, when the signal received at the control input 82 corresponds to a logical low signal, the result signal received at input 80 is transmitted as a selected signal from the output 84 of the selection circuit 58 to an input 86 of the latch 60. Conversely, when the signal received at the control input 82 corresponds to a logical high signal, the result signal received at input 78 is transmitted from the output 84 of the selection circuit 58 as the selected signal to an input 86 of the latch 60. Latch 60 may also include an input 88 that receives the clock signal for use in outputting the result signal received at input 86 at a particular time (i.e., in conjunction with the clock signal) via output 90 of the latch 60 as an output signal Dout. The output signal Dout is also transmitted from output 94 of the DFE 206 as an equalized signal (i.e., a corrected bit). As additionally illustrated, this output signal Dout is transmitted as a feedback signal for the selection circuit 58 via path 92, which is coupled to a control circuit 208 that generates and outputs a selection control signal to control input 82 of the selection circuit 58. The selection control signal is used to control selection of the result signal received at input 78 or input 80.

The control circuit 208 includes input 210, input 212, circuitry 214, and an output 216. In one embodiment, the input 210 is coupled to the path 92 to receive the output signal Dout. Input 212 is coupled to path 217 and receives the result signal generated by the receiver 54 that is transmitted from output 74 of the receiver 54 as a result of a comparison between the input bit (e.g., Din) against the reference voltage VrefNom. The circuitry 214 can include one or more logic circuits. For example, an inverter 218 can be coupled to the input 210 to invert the output signal Dout (or the input 210 can be an inverted input). The inverter 218 can be coupled to NAND gate 220 as an input thereto. A second input of the NAND gate 220 can be coupled to input 212. Thus, the NAND gate 220 can operate to generate the selection control signal based upon the logical value of the input bit Din (as the basis of the result signal received at input 212) and an inverse of the logical value of output signal Dout. The control circuit 208 can transmit the selection control signal to the control input 82 of the selection circuit 58 so that the selection control signal transmitted from output 216 can be used as the control signal for selection of the result signal received at input 78 or input 80.

In operation, when the control circuit 208 receives an output signal Dout having a logical low value and an input bit Din having a logical high value (e.g., equalization 160), the control circuit 208 generates and transmits a selection control signal with a logical low value, which causes selection of the result signal received at input 80 (utilizing the VrefLo as the reference voltage). Likewise, when the control circuit 208 receives an output signal Dout having a logical high value and an input bit Din having a logical high value (e.g., equalization 162), the control circuit 208 generates and transmits a selection control signal with a logical high value, which causes selection of the result signal received at input 78 (utilizing the VrefNom as the reference voltage). When the control circuit 208 receives an output signal Dout having a logical high value and an input bit Din having a logical low value (e.g., equalization 172), the control circuit 208 generates and transmits a selection control signal with a logical high value, which causes selection of the result signal received at input 78 (utilizing the VrefNom as the reference voltage).

In each of these situations, equalization is applied in a traditional manner (i.e., the logical value of the preceding bit is utilized to select a reference voltage selected to offset effects from the previously received bit based on its logical level). However, when the control circuit 208 receives an output signal Dout having a logical low value and an input bit Din having a logical low value (e.g., equalization 202), the control circuit 208 generates and transmits a selection control signal with a logical high value, which causes selection of the result signal received at input 78 (utilizing the VrefNom as the reference voltage). This is in contrast to traditional equalization, as the reference voltage selected is not applied based upon the logical value of the preceding bit (i.e., VrefLo is not applied as a reference voltage despite the previously received bit, Dout, having a logical low value). In this manner, equalization can be selectively disabled (e.g., in situations where the equalization would result in a reduced voltage margin due to asymmetries in the memory driver) as modified decision feedback equalization.

While the DFE 206 is a full-rate DFE 206, in other embodiments, selective application of equalization can be applied to, for example, a half-rate DFE that clocks on every other edge of a received clock signal. Similarly, selective application of equalization can be applied, for example, to a quarter-rate DFE, whereby instead of a pair of decisions on a rising edge of a clock and a pair of decisions on the falling edge of a clock (e.g., a half-rate DFE), the decisions can be spaced out such that a pair of decisions are made on a first rising edge of a clock, a pair of decisions are made on the first falling edge of the clock, a pair of decisions are made on a second rising edge of a clock, and a pair of decisions are made on the second falling edge of the clock such that the decisions are 90° with respect to one another. Likewise, the selective application of equalization can be applied, for example, a single tap or multi-tap DFEs. One embodiment of a single tap half-rate DFE that clocks on every other edge of a received clock signal is illustrated in FIG. 8.

FIG. 8 illustrates an embodiment of a DFE 222 in place of the DFE 206. As illustrated, the DFE 222 is a single tap DFE that clocks on every other edge of a received clock signal (i.e., a half-rate single tap DFE 222). Moreover, it should be noted that in other embodiments, more than one tap may be utilized in conjunction with the DFE 222. Similar to DFE 96, the DFE 222 includes a receiver 54 (e.g., a comparator), input 55, a receiver 56 (e.g., a comparator), input 57, a selection circuit 58 (e.g., a multiplexer), a latch 60 (e.g., flip-flop), and an output 94. Additionally, the DFE 222 includes latch 98, latch 100, latch 102, latch 104, selection circuit 106, latch 108, and output 110.

In general operation, the DFE 222 receives input bits (e.g., Din) at input 55 and generates corrected bits (e.g., Dout) for transmission at output 94 and output 110 (e.g., a pin, connector, or the like). The corrected bits have either a logical high state or a logical low state as determined based partially on the value of at least one previously corrected bit, as discussed in more detail below. Furthermore, as described herein, the output 94 will transmit odd bits of Dout (i.e., the first, third, fifth, etc.) while the output 110 will transmit the even bits of Dout (i.e., the second, fourth, sixth, etc.).

More specifically, an input bit is transmitted to input 62 of receiver 54 and input 64 of receiver 56. Additionally, receiver 54 receives a reference voltage (VrefNom) at input 66 of the receiver 54 while receiver 56 receives a reference voltage (VrefLo) at input 68 of the receiver 56. The VrefNom at input 66 may have a higher voltage than the voltage of VrefLo at input 68 and may be generated and/or selected in the manner described above with respect to FIG. 6. Each of the receivers 54 and 56 also receive the clock signal (e.g., DQS) at input 70 and input 72, respectively, from input 57. In operation, the receiver 54 compares the voltage of the input bit (e.g., Din) against the reference voltage VrefNom when a clock is received at input 70. Likewise, when the same clock signal is received at input 72, the receiver 56 compares the voltage of the input bit (e.g., Din) against the reference voltage VrefLo.

When the voltage of the input bit is recognized to be greater than the reference voltage VrefNom, a result signal corresponding to a logical high signal (e.g., "1") having, for example, a predetermined voltage value is generated by the receiver 54. Likewise, when the voltage of the input bit is recognized to be less than the reference voltage VrefNom, a result signal corresponding to a logical low signal (e.g., "0") having, for example, a second predetermined voltage value is generated by the receiver 54. The result signal generated by the receiver 54 is transmitted from an output 74 of the receiver 54.

Similarly, when the voltage of the input bit is recognized to be greater than the reference voltage VrefLo, a result signal corresponding to a logical high signal (e.g., "1") having, for example, a predetermined voltage value is generated by the receiver 56. Likewise, when the voltage of the input bit is recognized to be less than the reference voltage VrefLo, a result signal corresponding to a logical low signal (e.g., "0") having, for example, a second predetermined voltage value is generated by the receiver 56. The values for the VrefLo and/or the VrefNom may be provided by a band gap reference, a Digital-to-Analog Converter (DAC), a resistor-based voltage divider network, and the like. The result signal generated by the receiver 56 is transmitted from an output 76 of the receiver 56.

The result signal transmitted from output 74 of the receiver 54 is transmitted to input 112 of latch 98 and to input 114 of latch 102. Likewise, the result signal transmitted from output 76 of the receiver 56 is transmitted to input 116 of latch 100 and to input 118 of latch 104. Latch 98 and latch 100 each receive the clock signal (DQS) at input 119 and input 120, respectively (which may be delayed, for example, via the timing delay circuit 89). Latch 102 and latch 104 each receive the clock signal (DQS) at input 122 and input 124, respectively (which are inverted inputs) and the DQS signal may be delayed, for example, via the timing delay circuit 89. Latch 98 and latch 100 transmit their respectively received result signal (from input 112 and input 116, respectively) when the clock signal is on a rising edge and/or at a logical high value. In contrast, latch 102 and latch 104 transmit their respectively received result signal (from input 114 and input 118, respectively) when the clock signal is on a falling edge and/or at a logical low value.

Thus, a clocked result signal is transmitted from latch 98 to input 78 of the selection circuit 58 from output 126 of the latch 98 and a clocked result signal is transmitted from latch 100 to input 80 of the selection circuit 58 from output 128 of the latch 98 in response to a positive clock signal or a rising clock edge. Likewise, a clocked result signal is transmitted from latch 102 to input 130 of the selection circuit 106 from output 132 of the latch 102 and a clocked result signal is transmitted from latch 104 to input 134 of the selection circuit 106 from output 135 of the latch 104 in response to a negative clock signal or a falling clock edge.

The selection circuit 58 may operate to selectively transmit one of the result signals received at its input 78 or its input 80. In operation, this selection may be determined based upon the value of a signal received at a control input 82 of the selection circuit 58. For example, when the signal received at the control input 82 corresponds to a logical low signal, the result signal received at input 80 is transmitted as a selected signal from the output 84 of the selection circuit 58 to an input 86 of the latch 60. Conversely, when the signal received at the control input 82 corresponds to a logical high signal, the result signal received at input 78 is transmitted from the output 84 of the selection circuit 58 as the selected signal to an input 86 of the latch 60. Latch 60 may also include an input 88 that receives the clock signal, which may be delayed, for example, via a timing delay circuit 137. The clock signal received at input 88 can be utilized to clock the outputting of the result signal received at input 86 at a particular time (i.e., in conjunction with the clock signal) via output 90 of the latch 60 as an output signal Dout. The output signal Dout is also transmitted from output 94 of the DFE 222 as an equalized signal for odd bits of Dout. As additionally illustrated, this output signal Dout is transmitted as a feedback signal for the selection circuit 106 via path 136, which is coupled to a control circuit 224 that generates and outputs a selection control signal to a control input 138 of the selection circuit 106. The selection control signal is used to control selection of the result signal received at input 130 or input 134. In some embodiments the result signal transmitted from output 84 can instead be transmitted to the control circuit 224 in place of path 136 (e.g., depending on the speed of the operation of the DFE 222).

The control circuit 224 includes input 210, input 212, circuitry 214, and an output 216. In one embodiment, the input 210 is coupled to the path 136 to receive the output signal Dout. Input 212 is coupled to path 226 and receives the result signal generated by the receiver 54 that is delayed by latch 102 and transmitted from output 132 of the latch 102 as a result of a comparison between the input bit (e.g., Din) against the reference voltage VrefNom. The circuitry 214 can include one or more logic circuits. For example, an inverter 218 can be coupled to the input 210 to invert the output signal Dout (or the input 212 can be an inverted input). The inverter 218 can be coupled to NAND gate 220 as an input thereto. A second input of the NAND gate 220 can be coupled to input 212. Thus, the NAND gate 220 can operate to generate the selection control signal based upon the logical value of the input bit Din (as the basis of a clocked result signal received at input 212) and an inverse of the logical value of output signal Dout. The control circuit 224 can transmit the selection control signal to the control input 138 of the selection circuit 106 so that the selection control signal transmitted from output 216 can be used as the control signal for selection of the result signal received at input 130 or input 134.

In operation, when the control circuit 224 receives an output signal Dout having a logical low value and an input bit Din having a logical high value (e.g., equalization 160), the control circuit 224 generates and transmits a selection control signal with a logical low value, which causes selection of the result signal received at input 134 (utilizing the VrefLo as the reference voltage). Likewise, when the control circuit 224 receives an output signal Dout having a logical high value and an input bit Din having a logical high value (e.g., equalization 162), the control circuit 224 generates and transmits a selection control signal with a logical high value, which causes selection of the result signal received at input 130 (utilizing the VrefNom as the reference voltage). When the control circuit 224 receives an output signal Dout having a logical high value and an input bit Din having a logical low value (e.g., equalization 172), the control circuit 224 generates and transmits a selection control signal with a logical high value, which causes selection of the result signal received at input 130 (utilizing the VrefNom as the reference voltage).

In each of these situations, equalization is applied in a traditional manner (i.e., the logical value of the preceding bit is utilized to select a reference voltage selected to offset effects from the previously received bit based on its logical level). However, when the control circuit 224 receives an output signal Dout having a logical low value and an input bit Din having a logical low value (e.g., equalization 202), the control circuit 224 generates and transmits a selection control signal with a logical high value, which causes selection of the result signal received at input 130 (utilizing the VrefNom as the reference voltage). This is in contrast to traditional equalization, as the reference voltage selected is not applied based upon the logical value of the preceding bit (i.e., VrefLo is not applied as a reference voltage despite the previously received bit, Dout, having a logical low value). In this manner, equalization can be selectively disabled (e.g., in situations where the equalization would result in a reduced voltage margin due to asymmetries in the memory driver).

Thus, for example, when the signal received at the control input 138 corresponds to a logical low signal, the result signal received at input 134 is transmitted as a selected signal from the output 140 of the selection circuit 106 to an input 142 of the latch 108. Conversely, when the signal received at the control input 138 corresponds to a logical high signal, the result signal received at input 130 is transmitted from the output 140 of the selection circuit 106 as the selected signal to an input 142 of the latch 108. Latch 108 may also include an input 144 that receives the clock signal, which may be delayed, for example, via a timing delay circuit 137. The clock signal received at input 144 can be utilized to clock the outputting of the result signal received at input 142 at a particular time (i.e., in conjunction with the a negative edge of the clock signal or when the clock signal is a logical low value) via output 146 of the latch 108 as an output signal Dout. The output signal Dout is also transmitted from output 110 of the DFE 222 as an equalized signal for odd bits of Dout. As additionally illustrated, this output signal Dout is transmitted as a feedback signal for the selection circuit 58 via path 148, which is coupled to a control circuit 208 that generates and outputs a selection control signal to a control input 82 of the selection circuit 58. In some embodiments the result signal transmitted from output 140 can instead be transmitted to the control circuit 208 in place of path 148 (e.g., depending on the speed of the operation of the DFE 222). The selection control signal is used to control selection of the result signal received at input 78 or input 80 in a manner similar to that described above with respect to the control circuit 208 of FIG. 7.

More specifically, in operation, when the control circuit 208 receives an output signal Dout having a logical low value and an input bit Din having a logical high value (e.g., equalization 160), the control circuit 208 generates and transmits a selection control signal with a logical low value, which causes selection of the result signal received at input 80 (utilizing the VrefLo as the reference voltage). Likewise, when the control circuit 208 receives an output signal Dout having a logical high value and an input bit Din having a logical high value (e.g., equalization 162), the control circuit 208 generates and transmits a selection control signal with a logical high value, which causes selection of the result signal received at input 78 (utilizing the VrefNom as the reference voltage). When the control circuit 208 receives an output signal Dout having a logical high value and an input bit Din having a logical low value (e.g., equalization 172), the control circuit 208 generates and transmits a selection control signal with a logical high value, which causes selection of the result signal received at input 78 (utilizing the VrefNom as the reference voltage).

In each of these situations, equalization is applied in a traditional manner (i.e., the logical value of the preceding bit is utilized to select a reference voltage selected to offset effects from the previously received bit based on its logical level). However, when the control circuit 208 receives an output signal Dout having a logical low value and an input bit Din having a logical low value (e.g., equalization 202), the control circuit 208 generates and transmits a selection control signal with a logical high value, which causes selection of the result signal received at input 78 (utilizing the VrefNom as the reference voltage). This is in contrast to traditional equalization, as the reference voltage selected is not applied based upon the logical value of the preceding bit (i.e., VrefLo is not applied as a reference voltage despite the previously received bit, Dout, having a logical low value). In this manner, equalization can be selectively disabled (e.g., in situations where the equalization would result in a reduced voltage margin due to asymmetries in the memory driver) as modified decision feedback equalization.

Figure 9:
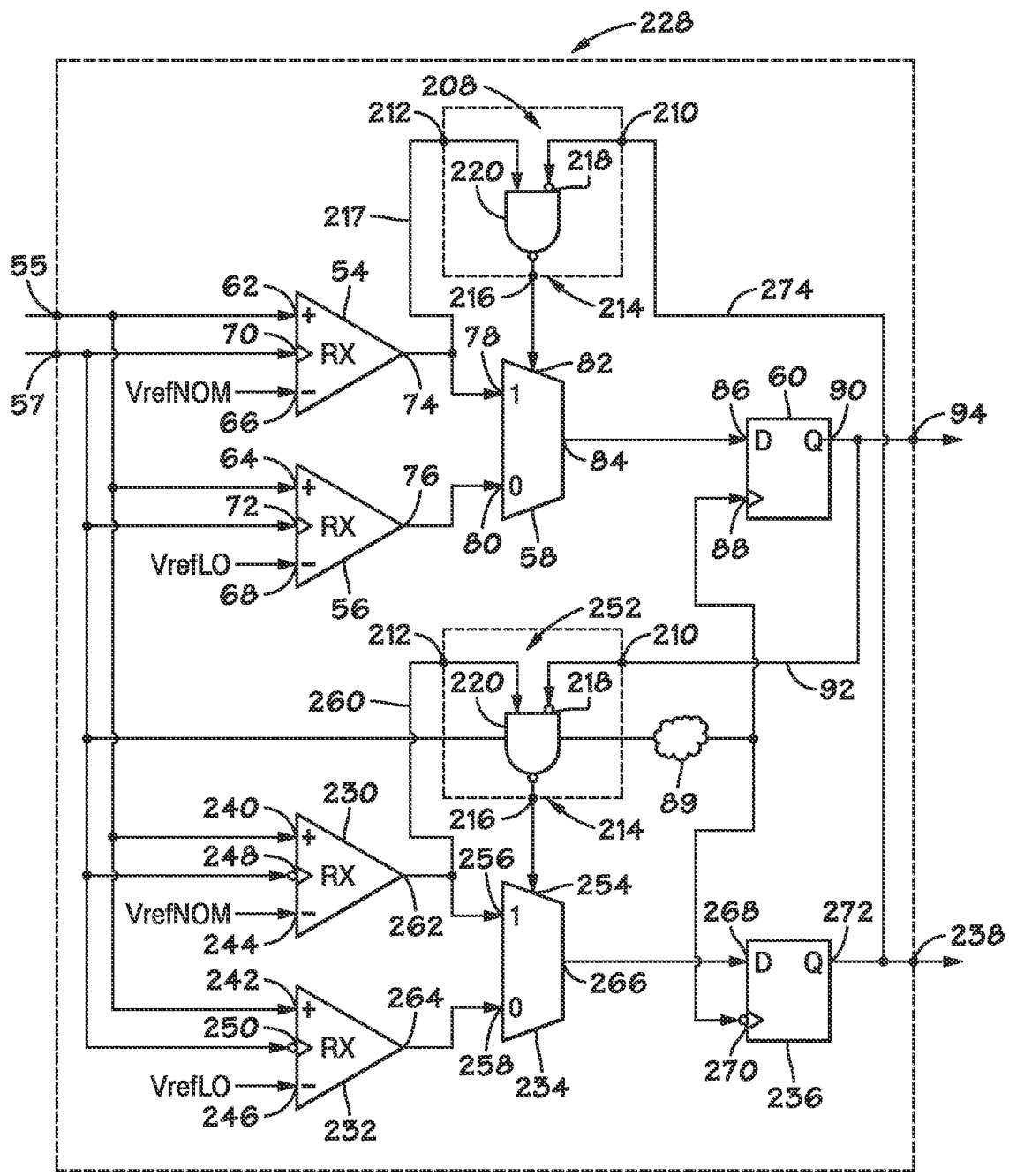
FIG. 9 illustrates a fourth embodiment of a decision feedback equalizer of the decision feedback equalizer circuitry of FIG. 2, according to an embodiment of the present disclosure.

FIG. 9 illustrates an embodiment of a DFE 228 in place of the DFE 222. As illustrated, the DFE 228 is a single tap DFE that clocks on every other edge of a received clock signal (i.e., a half-rate single tap DFE 228) without the associated latch 98, latch 100, latch 102, and latch 104 of the DFE 222. It should be noted that in other embodiments, more than one tap may be utilized in conjunction with the DFE 228. Similar to DFE 206, the DFE 228 includes a receiver 54 (e.g., a comparator), input 55, a receiver 56 (e.g., a comparator), input 57, a selection circuit 58 (e.g., a multiplexer), a latch 60 (e.g., flip-flop), and an output 94. The DFE 228 additionally includes a receiver 230 (e.g., a comparator), a receiver 232 (e.g., a comparator), input 57, a selection circuit 58 (e.g., a multiplexer), a latch 60 (e.g., flip-flop), and an output 238.

In general operation, the DFE 228 receives input bits (e.g., Din) at input 55 and generates corrected bits (e.g., Dout) for transmission at output 94 (e.g., a pin, connector, or the like) and output 238, whereby the output 94 will transmit odd bits of Dout (i.e., the first, third, fifth, etc.) while the output 238 will transmit the even bits of Dout (i.e., the second, fourth, sixth, etc.). The corrected bits have either a logical high state or a logical low state as determined based partially on the value of at least one previously corrected bit, as discussed in more detail below.

More specifically, an input bit Din is transmitted to input 62 of receiver 54, input 64 of receiver 56, input 240 of receiver 230, and input 242 of receiver 232. Additionally, receiver 54 receives a reference voltage (VrefNom) at input 66 of the receiver 54 and receiver 230 receives a reference voltage (VrefNom) at input 244 of the receiver 230 while receiver 56 receives a reference voltage (VrefLo) at input 68 of the receiver 56 and receiver 232 receives a reference voltage (VrefLo) at input 246 of the receiver 232. The VrefNom at input 66 may have a higher voltage than the voltage of VrefLo at input 68 (as discussed above with respect to FIG. 6). Each of the receivers 54 and 56 also receive the clock signal (e.g., DQS) at input 70 and input 72, respectively, from input 57. Likewise, receivers 230 and 232 also receive the clock signal (e.g., DQS) from input 57. However, receiver 230 includes an input 248 as an inverted input (or an inverter coupled to the input 248) and receiver 232 includes an input 250 as an inverted input (or an inverter coupled to the input 250) such that receiver 230 and receiver 232 operate on low signals, in contrast to the receiver 54 and the receiver 56.

In operation, the receiver 54 compares the voltage of the input bit (e.g., Din) against the reference voltage VrefNom when a clock is received at input 70. Likewise, when the same clock signal is received at input 72, the receiver 56 compares the voltage of the input bit (e.g., Din) against the reference voltage VrefLo.

When the voltage of the input bit is recognized to be greater than the reference voltage VrefNom, a result signal corresponding to a logical high signal (e.g., "1") having, for example, a predetermined voltage value is generated by the receiver 54. Likewise, when the voltage of the input bit is recognized to be less than the reference voltage VrefNom, a result signal corresponding to a logical low signal (e.g., "0") having, for example, a second predetermined voltage value is generated by the receiver 54. The result signal generated by the receiver 54 is transmitted from an output 74 of the receiver 54 to, for example, input 78 of the selection circuit 58.

Similarly, when the voltage of the input bit is recognized to be greater than the reference voltage VrefLo, a result signal corresponding to a logical high signal (e.g., "1") having, for example, a predetermined voltage value is generated by the receiver 56. Likewise, when the voltage of the input bit is recognized to be less than the reference voltage VrefLo, a result signal corresponding to a logical low signal (e.g., "0") having, for example, a second predetermined voltage value is generated by the receiver 56. The values for the VrefLo and/or the VrefNom may be provided by a band gap reference, a Digital-to-Analog Converter (DAC), a resistor-based voltage divider network, and the like. The result signal generated by the receiver 56 is transmitted from an output 76 of the receiver 56 to, for example, input 80 of the selection circuit 58.

The selection circuit 58 may operate to selectively transmit one of the result signals received at its input 78 or its input 80. In operation, this selection may be determined based upon the value of a signal received at a control input 82 of the selection circuit 58. For example, when the signal received at the control input 82 corresponds to a logical low signal, the result signal received at input 80 is transmitted as a selected signal from the output 84 of the selection circuit 58 to an input 86 of the latch 60. Conversely, when the signal received at the control input 82 corresponds to a logical high signal, the result signal received at input 78 is transmitted from the output 84 of the selection circuit 58 as the selected signal to an input 86 of the latch 60. Latch 60 may also include an input 88 that receives the clock signal for use in outputting the result signal received at input 86 at a particular time (i.e., in conjunction with the clock signal) via output 90 of the latch 60 as an output signal Dout. The output signal Dout is also transmitted from output 94 of the DFE 228 as an equalized signal. As additionally illustrated, this output signal Dout is transmitted as a feedback signal for the selection circuit 234 via path 92, which is coupled to a control circuit 252 that generates and outputs a selection control signal to control input 254 of the selection circuit 234. The selection control signal is used to control selection of the result signal received at input 256 or input 258. In some embodiments the result signal transmitted from output 84 can instead be transmitted to the control circuit 252 in place of path 92 (e.g., depending on the speed of the operation of the DFE 228).

The control circuit 252 includes input 210, input 212, circuitry 214, and an output 216. In one embodiment, the input 210 is coupled to the path 92 to receive the output signal Dout. Input 212 is coupled to path 260 and receives the result signal generated by the receiver 230 that is transmitted from output 262 of the receiver 230 as a result of a comparison between the input bit (e.g., Din) against the reference voltage VrefNom. The circuitry 214 can include one or more logic circuits. For example, an inverter 218 can be coupled to the input 210 to invert the output signal Dout (or the input 212 can be an inverted input). The inverter 218 can be coupled to NAND gate 220 as an input thereto. A second input of the NAND gate 220 can be coupled to input 212. Thus, the NAND gate 220 can operate to generate the selection control signal based upon the logical value of the input bit Din (as the basis of a result signal received at input 212) and an inverse of the logical value of output signal Dout. The control circuit 252 can transmit the selection control signal to the control input 254 of the selection circuit 234 so that the selection control signal transmitted from output 216 can be used as the control signal for selection of the result signal received at input 256 or input 258.

In operation, when the control circuit 252 receives an output signal Dout having a logical low value and an input bit Din having a logical high value (e.g., equalization 160), the control circuit 252 generates and transmits a selection control signal with a logical low value, which causes selection of the result signal received at input 258 (utilizing the VrefLo as the reference voltage). Likewise, when the control circuit 252 receives an output signal Dout having a logical high value and an input bit Din having a logical high value (e.g., equalization 162), the control circuit 252 generates and transmits a selection control signal with a logical high value, which causes selection of the result signal received at input 256 (utilizing the VrefNom as the reference voltage). When the control circuit 252 receives an output signal Dout having a logical high value and an input bit Din having a logical low value (e.g., equalization 172), the control circuit 252 generates and transmits a selection control signal with a logical high value, which causes selection of the result signal received at input 256 (utilizing the VrefNom as the reference voltage).

In each of these situations, equalization is applied in a traditional manner (i.e., the logical value of the preceding bit is utilized to select a reference voltage selected to offset effects from the previously received bit based on its logical level). However, when the control circuit 252 receives an output signal Dout having a logical low value and an input bit Din having a logical low value (e.g., equalization 202), the control circuit 252 generates and transmits a selection control signal with a logical high value, which causes selection of the result signal received at input 256 (utilizing the VrefNom as the reference voltage). This is in contrast to traditional equalization, as the reference voltage selected is not applied based upon the logical value of the preceding bit (i.e., VrefLo is not applied as a reference voltage despite the previously received bit, Dout, having a logical low value). In this manner, equalization can be selectively disabled (e.g., in situations where the equalization would result in a reduced voltage margin due to asymmetries in the memory driver) as modified decision feedback equalization.

Furthermore, in operation, the receiver 230 compares the voltage of the input bit (e.g., Din) against the reference voltage VrefNom when a low clock signal is received at input 248. Likewise, when the same clock signal is received at input 250, the receiver 232 compares the voltage of the input bit (e.g., Din) against the reference voltage VrefLo. When the voltage of the input bit is recognized to be greater than the reference voltage VrefNom, a result signal corresponding to a logical high signal (e.g., "1") having, for example, a predetermined voltage value is generated by the receiver 230. Likewise, when the voltage of the input bit is recognized to be less than the reference voltage VrefNom, a result signal corresponding to a logical low signal (e.g., "0") having, for example, a second predetermined voltage value is generated by the receiver 230. The result signal generated by the receiver 230 is transmitted from an output 262 of the receiver 230 to, for example, input 256 of the selection circuit 234.

Similarly, when the voltage of the input bit is recognized to be greater than the reference voltage VrefLo, a result signal corresponding to a logical high signal (e.g., "1") having, for example, a predetermined voltage value is generated by the receiver 232. Likewise, when the voltage of the input bit is recognized to be less than the reference voltage VrefLo, a result signal corresponding to a logical low signal (e.g., "0") having, for example, a second predetermined voltage value is generated by the receiver 232. The values for the VrefLo and/or the VrefNom may be provided by a band gap reference, a Digital-to-Analog Converter (DAC), a resistor-based voltage divider network, and the like. The result signal generated by the receiver 232 is transmitted from an output 264 of the receiver 232 to, for example, input 258 of the selection circuit 234.

The selection circuit 234 may operate to selectively transmit one of the result signals received at its input 256 or its input 258. In operation, this selection may be determined based upon the value of a signal received at a control input 254 of the selection circuit 234. For example, when the signal received at the control input 254 corresponds to a logical low signal, the result signal received at input 258 is transmitted as a selected signal from the output 266 of the selection circuit 234 to an input 268 of the latch 236. Conversely, when the signal received at the control input 254 corresponds to a logical high signal, the result signal received at input 256 is transmitted from the output 266 of the selection circuit 234 as the selected signal to an input 268 of the latch 236. Latch 236 may also include an input 270 that may be an inverted input (or an inverter coupled to input 270) that receives the clock signal for use in outputting the result signal received at input 268 at a particular time (i.e., in conjunction with the a low value of the clock signal) via output 272 of the latch 236 as an output signal Dout. The output signal Dout is also transmitted from output 238 of the DFE 228 as an equalized signal. As additionally illustrated, this output signal Dout is transmitted as a feedback signal for the selection circuit 58 via path 274, which is coupled to a control circuit 208 that generates and outputs a selection control signal to control input 82 of the selection circuit 58. The selection control signal is used to control selection of the result signal received at input 78 or input 80. In some embodiments the result signal transmitted from output 266 can instead be transmitted to the control circuit 208 in place of path 274 (e.g., depending on the speed of the operation of the DFE 228).

The control circuit 208 includes input 210, input 212, circuitry 214, and an output 216. In one embodiment, the input 210 is coupled to the path 274 to receive the output signal Dout. Input 212 is coupled to path 217 and receives the result signal generated by the receiver 54 that is transmitted from output 74 of the receiver 54 as a result of a comparison between the input bit (e.g., Din) against the reference voltage VrefNom. The circuitry 214 can include one or more logic circuits. For example, an inverter 218 can be coupled to the input 210 to invert the output signal Dout (or the input 212 can be an inverted input). The inverter 218 can be coupled to NAND gate 220 as an input thereto. A second input of the NAND gate 220 can be coupled to input 212. Thus, the NAND gate 220 can operate to generate the selection control signal based upon the logical value of the input bit Din (as the basis of a result signal received at input 212) and an inverse of the logical value of output signal Dout. The control circuit 208 can transmit the selection control signal to the control input 82 of the selection circuit 58 so that the selection control signal transmitted from output 216 can be used as the control signal for selection of the result signal received at input 78 or input 80.

In operation, when the control circuit 208 receives an output signal Dout having a logical low value and an input bit Din having a logical high value (e.g., equalization 160), the control circuit 208 generates and transmits a selection control signal with a logical low value, which causes selection of the result signal received at input 80 (utilizing the VrefLo as the reference voltage). Likewise, when the control circuit 208 receives an output signal Dout having a logical high value and an input bit Din having a logical high value (e.g., equalization 162), the control circuit 208 generates and transmits a selection control signal with a logical high value, which causes selection of the result signal received at input 78 (utilizing the VrefNom as the reference voltage). When the control circuit 208 receives an output signal Dout having a logical high value and an input bit Din having a logical low value (e.g., equalization 172), the control circuit 208 generates and transmits a selection control signal with a logical high value, which causes selection of the result signal received at input 78 (utilizing the VrefNom as the reference voltage).

In each of these situations, equalization is applied in a traditional manner (i.e., the logical value of the preceding bit is utilized to select a reference voltage selected to offset effects from the previously received bit based on its logical level). However, when the control circuit 208 receives an output signal Dout having a logical low value and an input bit Din having a logical low value (e.g., equalization 202), the control circuit 208 generates and transmits a selection control signal with a logical high value, which causes selection of the result signal received at input 78 (utilizing the VrefNom as the reference voltage). This is in contrast to traditional equalization, as the reference voltage selected is not applied based upon the logical value of the preceding bit (i.e., VrefLo is not applied as a reference voltage despite the previously received bit, Dout, having a logical low value). In this manner, equalization can be selectively disabled (e.g., in situations where the equalization would result in a reduced voltage margin due to asymmetries in the memory driver) as modified decision feedback equalization.

Figure 10:
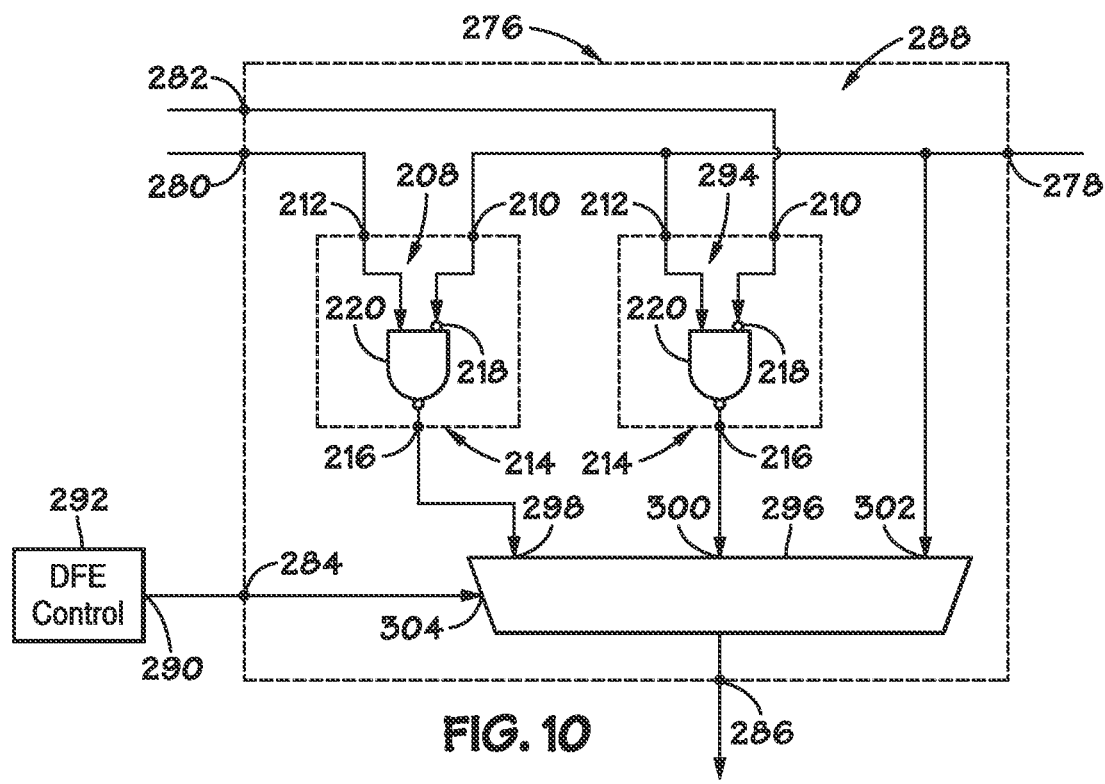
FIG. 10 illustrates decision feedback equalizer selection circuitry, according to an embodiment of the present disclosure.

FIG. 10 illustrates an example of DFE selection circuitry 276 that can be utilized in conjunction with any one of the DFE 206, the DFE 222, the DFE 228 or another DFE circuit that allows for selective equalization in the manner described above in conjunction with FIG. 6. More specifically, the DFE selection circuitry 276 can be utilized in place of the control circuit 208 of FIG. 7, the control circuit 208 and/or the control circuit 224 of FIG. 8, and the control circuit 208 and/or the control circuit 252 of FIG. 9. In some embodiments, it is advantageous to have circuitry that allows for selective use of decision feedback equalization based on the operating characteristics of the memory device 10 (including, for example, the physical characteristics of the memory drivers used and/or the memory elements of the memory bank 12). As previously discussed, in some environments, there may be an asymmetric response in when portions of a memory device (e.g., a memory driver) switch from a logical low (i.e., "0") signal to a logical high (e.g., "1") signal. Use of the DFE selection circuitry 276 may allow for individually tailored selection of the decision feedback equalization applied (or selectively prevented) based on whether asymmetric responses for a particular memory element, memory driver, and/or memory device 10 occur and if so, whether the asymmetric response occurs during a logical high transition (e.g., from a logical low signal to a logical high signal) or whether the asymmetric response occurs during a logical low transition (e.g., from a logical high signal to a logical low signal).

The DFE selection circuitry 276 includes input 278, input 280, input 282, input 284, output 286, and circuitry 288. In some embodiments, input 278 in operation receives output signal Dout as a feedback signal (i.e., input 278 is a feedback input for the DFE selection circuitry 276). Accordingly, input 278 is coupled to path 92 of the DFE 206 when the DFE selection circuitry 276 replaces the control circuit 208 of the DFE 206. Input 278 would is coupled to path 148 of the DFE 222 when the DFE selection circuitry 276 replaces the control circuit 208 of the DFE 222 and input 278 is coupled to path 136 of the DFE 222 when the DFE selection circuitry 276 replaces the control circuit 224 of the DFE 222. Similarly, input 278 is coupled to path 274 of the DFE 228 when the DFE selection circuitry 276 replaces the control circuit 208 of the DFE 228 and input 278 is coupled to path 92 of the DFE 228 when the DFE selection circuitry 276 replaces the control circuit 252 of the DFE 228.

In some embodiments, input 280 in operation receives a result signal generated by a receiver 54 as a result of a comparison between the input bit Din against the reference voltage VrefNom. Thus, input 280 is coupled to path 217 and receives the result signal generated by the receiver 54 that is transmitted from output 74 of the receiver 54 as a result of a comparison between the input bit (e.g., Din) against the reference voltage VrefNom when the DFE selection circuitry 276 replaces the control circuit 208 of the DFE 206. Input 280 is coupled to path 217 and receives the clocked result signal transmitted from output 126 of the latch 98 when the DFE selection circuitry 276 replaces the control circuit 208 of the DFE 222 and input 280 is coupled to path 226 and receives the clocked result signal transmitted from output 132 of the latch 102 when the DFE selection circuitry 276 replaces the control circuit 224 of the DFE 222. Similarly, input 280 is coupled to path 217 and receives the result signal generated by the receiver 54 that is transmitted from output 74 of the receiver 54 as a result of a comparison between the input bit (e.g., Din) against the reference voltage VrefNom when the DFE selection circuitry 276 replaces the control circuit 208 of the DFE 228 and input 280 is coupled to path 260 and receives the result signal generated by the receiver 230 that is transmitted from output 262 of the receiver 230 as a result of a comparison between the input bit (e.g., Din) against the reference voltage VrefNom when the DFE selection circuitry 276 replaces the control circuit 252 of the DFE 228.

In some embodiments, input 282 in operation receives a result signal generated by a receiver 56 as a result of a comparison between the input bit Din against the reference voltage VrefLo. Thus, input 282 is coupled to a path that receives the result signal generated by the receiver 56 that is transmitted from output 76 of the receiver 56 as a result of a comparison between the input bit (e.g., Din) against the reference voltage VrefLo when the DFE selection circuitry 276 replaces the control circuit 208 of the DFE 206. Input 282 is coupled to a path and receives the clocked result signal transmitted from output 128 of the latch 100 when the DFE selection circuitry 276 replaces the control circuit 208 of the DFE 222 and input 282 is coupled to a path and receives the clocked result signal transmitted from output 135 of the latch 104 when the DFE selection circuitry 276 replaces the control circuit 224 of the DFE 222. Similarly, input 282 is coupled to a path and receives the result signal generated by the receiver 56 that is transmitted from output 76 of the receiver 56 as a result of a comparison between the input bit (e.g., Din) against the reference voltage VrefLo when the DFE selection circuitry 276 replaces the control circuit 208 of the DFE 228 and input 282 is coupled to a path and receives the result signal generated by the receiver 232 that is transmitted from output 264 of the receiver 232 as a result of a comparison between the input bit (e.g., Din) against the reference voltage VrefLo when the DFE selection circuitry 276 replaces the control circuit 252 of the DFE 228.

Input 284, in some embodiments, receives a control signal used to control operation of the DFE selection circuitry 276. This control signal may be generated and/or transmitted from an output 290 of a DFE controller 292. The DFE controller 292 may be part of a memory controller of the memory device 10 (e.g., it may be an operation performed by the memory controller or physical circuitry in the memory controller) or a separate controller or a separate controller operation. In operation, the DFE controller 292 receives an indication of whether asymmetric responses for a particular memory element, memory driver, and/or memory device 10 occur and if so, whether the asymmetric response occurs during a logical high transition (e.g., from a logical low signal to a logical high signal) or whether the asymmetric response occurs during a logical low transition (e.g., from a logical high signal to a logical low signal). The DFE controller 292 may generate and transmit a control signal to input 284 to control operation of the DFE selection circuitry 276, as will be discussed below in greater detail.

The DFE selection circuitry includes output 286. In operation, output 286 is utilized by the DFE selection circuitry 276 to transmit a selection control signal to the control input 82 of the selection circuit 58 when the DFE selection circuitry 276 replaces the control circuit 208 of the DFE 206 so that the selection control signal transmitted from output 286 can be used as the control signal for selection of the result signal received at input 78 or input 80 of the selection circuit 58. Likewise, output 286 is utilized by the DFE selection circuitry 276 to transmit a selection control signal to the control input 82 of the selection circuit 58 when the DFE selection circuitry 276 replaces the control circuit 208 of the DFE 222 so that the selection control signal transmitted from output 286 can be used as the control signal for selection of the result signal received at input 78 or input 80 of the selection circuit 58 and output 286 is utilized by the DFE selection circuitry 276 to transmit a selection control signal to the control input 138 of the selection circuit 106 when the DFE selection circuitry 276 replaces the control circuit 224 of the DFE 222 so that the selection control signal transmitted from output 286 can be used as the control signal for selection of the result signal received at input 130 or input 134 of the selection circuit 106. Similarly, output 286 is utilized by the DFE selection circuitry 276 to transmit a selection control signal to the control input 82 of the selection circuit 58 when the DFE selection circuitry 276 replaces the control circuit 208 of the DFE 228 so that the selection control signal transmitted from output 286 can be used as the control signal for selection of the result signal received at input 78 or input 80 of the selection circuit 58 and output 286 is utilized by the DFE selection circuitry 276 to transmit a selection control signal to the control input 254 of the selection circuit 234 when the DFE selection circuitry 276 replaces the control circuit 252 of the DFE 228 so that the selection control signal transmitted from output 286 can be used as the control signal for selection of the result signal received at input 256 or input 258 of the selection circuit 234.

Additionally, as previously noted, the DFE selection circuitry 276 includes circuitry 288. The circuitry 288 includes, for example, control circuit 208, control circuit 294, and selection circuit 296. The control circuit 208 includes input 210, input 212, circuitry 214, and an output 216. In one embodiment, the input 210 of control circuit 208 is coupled to input 278 to receive the output signal Dout. Input 212 of control circuit 208 is coupled to input 280 and receives a result signal received by the input 280. The circuitry 214 of control circuit 208 can include one or more logic circuits. For example, an inverter 218 can be coupled to the input 210 of control circuit 208 to invert the output signal Dout (or the input 212 can be an inverted input). The inverter 218 can be coupled to NAND gate 220 of control circuit 208 as an input thereto. A second input of the NAND gate 220 of control circuit 208 can be coupled to input 212. Thus, the NAND gate 220 of control circuit 208 can operate to generate a selection control signal based upon the logical value of the input bit Din (as the basis of a result signal or a clocked result signal received at input 212, based on whether the DFE selection circuitry 276 replaces the control circuit 208 of the DFE 206, the control circuit 208 of the DFE 222, the control circuit 224 of the DFE 222, the control circuit 208 of the DFE 228, or the control circuit 252 of the DFE 228) and an inverse of the logical value of output signal Dout. The control circuit 208 can transmit the selection control signal that is generated to input 298 of the selection circuit 296.

The control circuit 294 includes input 210, input 212, circuitry 214, and an output 216. In one embodiment, the input 210 of control circuit 294 is coupled to input 282 to receive the result signal received by the input 282. Input 212 of control circuit 294 is coupled to input 282 to receive the output signal Dout. The circuitry 214 of control circuit 294 can include one or more logic circuits. For example, an inverter 218 can be coupled to the input 210 of control circuit 294 to invert the result signal received by the input 282 (or the input 212 can be an inverted input). The inverter 218 can be coupled to NAND gate 220 of control circuit 294 as an input thereto. A second input of the NAND gate 220 of control circuit 294 can be coupled to input 212 to receive the output signal Dout. Thus, the NAND gate 220 of control circuit 294 can operate to generate a selection control signal based upon the logical value of the output signal Dout and an inverse of the logical value of input bit Din (as the basis of a result signal or a clocked result signal received at input 210, based on whether the DFE selection circuitry 276 replaces the control circuit 208 of the DFE 206, the control circuit 208 of the DFE 222, the control circuit 224 of the DFE 222, the control circuit 208 of the DFE 228, or the control circuit 252 of the DFE 228). The control circuit 294 can transmit the selection control signal that is generated to input 300 of the selection circuit 296.

Selection circuit 296 also includes an input 302. Input 302 is coupled to input 278 and receives the output signal Dout therefrom. In operation, the selection circuit 296 may be a multiplexer, such as a 3-to-1 multiplexer. The selection circuit 296 receives a control signal from input 284 at a control input 304 of the selection circuit 296. The selection circuit 296 selects as an output one of the signals received at input 298, input 300, or input 302 and transmits the selected signal to output 286 of the DFE selection circuitry 276.

For example, when the control signal from input 284 has a first value, the selection circuit 296 will select the signal received at input 298 to transmit as an output signal to output 286. This first value of the control signal from input 284 corresponds the occurrence of an asymmetric response for a particular memory element, memory driver, and/or memory device 10, whereby the asymmetric response occurs during a logical high transition (e.g., from a logical low signal to a logical high signal, a DFE high level). This results in selection of the outputs of the control circuit 208 of the DFE selection circuitry 276 and allows the DFE selection circuitry 276 to provide modified decision feedback equalization whereby when the output signal Dout has a logical low value and the input bit Din (as the basis of a result signal or a clocked result signal received at input 212) has a logical low value (e.g., equalization 202), the control circuit 208 of the DFE selection circuitry 276 generates and transmits a selection control signal with a logical high value, transmitted to the output 286 to causes selection of the result signal received at input 78, selection of the clocked result signal received at input 78 or input 130, or selection of the result signal received at input 256 (utilizing the VrefNom as the reference voltage). This is in contrast to traditional equalization, as the reference voltage or clocked reference voltage selected is not applied based upon the logical value of the preceding bit (i.e., VrefLo is not applied as a reference voltage despite the previously received bit, Dout, having a logical low value). In this manner, equalization can be selectively disabled (e.g., in situations where the equalization would result in a reduced voltage margin due to asymmetries in the memory driver).

When the control signal from input 284 has a second value, the selection circuit 296 will select the signal received at input 300 to transmit as an output signal to output 286. This second value of the control signal from input 284 corresponds the occurrence of an asymmetric response for a particular memory element, memory driver, and/or memory device 10, whereby the asymmetric response occurs during a logical low transition (e.g., from a logical high signal to a logical low signal, a DFE low level). This results in selection of the outputs of the control circuit 294 of the DFE selection circuitry 276 and allows the DFE selection circuitry 276 to provide modified decision feedback equalization whereby when the output signal Dout has a logical high value and the input bit Din (as the basis of a result signal or a clocked result signal received at input 210) has a logical high value, the control circuit 294 of the DFE selection circuitry 276 generates and transmits a selection control signal with a logical high value, transmitted to the output 286 to causes selection of the result signal received at input 80, selection of the clocked result signal received at input 80 or input 134, or selection of the result signal received at input 258 (utilizing the VrefLo as the reference voltage). This is in contrast to traditional equalization, as the reference voltage or clocked reference voltage selected is not applied based upon the logical value of the preceding bit (i.e., VrefNom is not applied as a reference voltage despite the previously received bit, Dout, having a logical high value). In this manner, equalization can be selectively disabled (e.g., in situations where the equalization would result in a reduced voltage margin due to asymmetries in the memory driver).

Finally, when the control signal from input 284 has a third value, the selection circuit 296 will select the signal received at input 302 to transmit as an output signal to output 286. This third value of the control signal from input 284 corresponds the no occurrence of an asymmetric response for a particular memory element, memory driver, and/or memory device 10. This corresponds to no disabling of traditional equalization (i.e., VrefNom is applied as a reference voltage when the previously received bit, Dout, has a logical high value and VrefLo is applied as a reference voltage when the previously received bit, Dout, has a logical low value). This third signal is useful when asymmetric responses are not found to be present for a particular memory element, memory driver, and/or memory device 10.

In some embodiments, training of the memory device 10 (e.g., the memory elements of the memory banks 12) may occur when the memory device 10 is activated. This may occur, for example, during initial manufacturing testing of the memory device 10 and/or once the memory device 10 is placed in and utilized in a host device or at predetermined times once the memory device 10 is placed in and utilized in a host device or after a predetermined number of cycles once the memory device 10 is placed in and utilized in a host device. This training can be useful to maintain sufficient data capture margin (i.e., data capture margins may be tested and adjusted if they reach and/or fall below a certain threshold). Likewise, in some embodiments, this training of the memory device 10 may be utilized to generate the indication of whether asymmetric responses for a particular memory element, memory driver, and/or memory device 10 occur and if so, whether the asymmetric response occurs during a logical high transition (e.g., from a logical low signal to a logical high signal) or whether the asymmetric response occurs during a logical low transition (e.g., from a logical high signal to a logical low signal). This indication may be generated by the DFE controller 292 or received by the DFE controller 292 and the DFE controller 292, as previously described, may generate and transmit a control signal to input 284 to control operation of the DFE selection circuitry 276.

Figure 11:
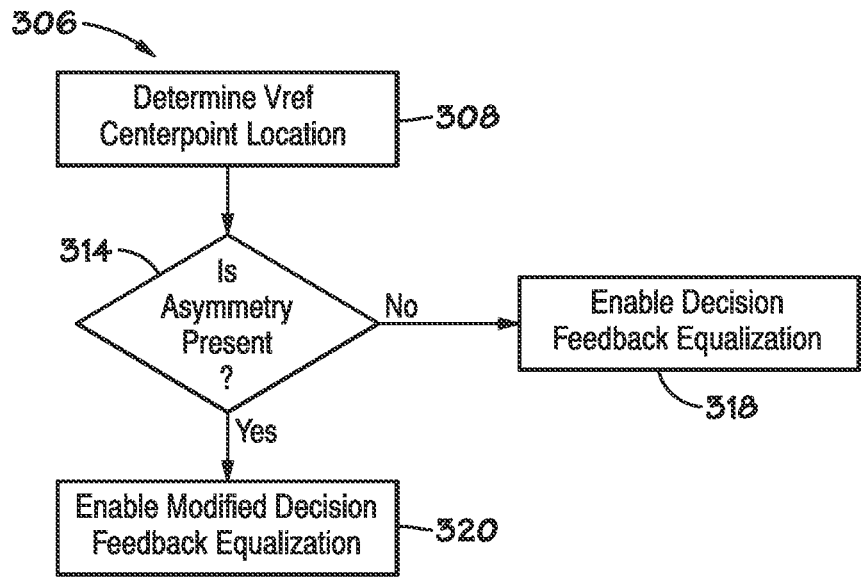
FIG. 11 illustrates a method of training a memory element of the memory device, according to an embodiment of the present disclosure.

FIG. 11 illustrates a method 306 of memory device 10 training that may be utilized to generate the indication of whether asymmetric responses for a particular memory element, memory driver, and/or memory device 10 occur (e.g., due to operational characteristics of the memory elements, for example, based on the respective drive strengths and/or termination strengths) and if so, whether the asymmetric response occurs during a logical high transition (e.g., from a logical low signal to a logical high signal) or whether the asymmetric response occurs during a logical low transition (e.g., from a logical high signal to a logical low signal). In step 308, a reference voltage Vref center point location is determined, for example, via sample timing and sweeping of the reference voltage Vref to generate an eye diagram 310 of FIG. 12. This will also generate characteristics of pass/fail data capture that makes up the eye diagram 310, which can be utilized to determine the reference voltage Vref center point location (e.g., to maximize voltage margin above and below the reference voltage Vref). The eye diagram 310 of FIG. 12 also includes by the arrow 312 as having a particular voltage level. Thus, step 308 of FIG. 11 can be accomplished, for example, through a sweep of DQS signals and Vref values to locate the particular voltage level (illustrated by arrow 312) that is the Vref center point (which minimizes timing jitter at the edges of the eye diagram 310).

In step 314 of FIG. 11, a determination is made as to whether asymmetry is present in the memory device. One example of the process of step 314 is illustrated in the eye diagram 310 of FIG. 12, whereby the process of step 314 can include sweeping Vref with DQS signals up and down from the arrow 312 (sweeping voltages above and below the particular voltage level determined in step 308, as illustrated by arrow 316). This will operate to locate asymmetries (i.e., the sweeping will not be equal in distance above and below the particular voltage level when an asymmetry is present). If no asymmetry is determined to be present in step 314 of FIG. 11 (i.e., if an asymmetry is determined not to be present), a corresponding indication, in step 318, is generated (either via the DFE controller 292 or is subsequently transmitted to the DFE controller 292) so that the DFE controller 292 generates a control signal transmitted to input 284 to select input 302 of the selection circuit 296.

If instead, in step 314 of FIG. 11, an asymmetry is determined to be present, in step 320, a corresponding indication is generated (either via the DFE controller 292 or is subsequently transmitted to the DFE controller 292). As the determination in step 314 includes determining whether the asymmetry is a high level asymmetry (e.g., an asymmetry when transitioning from a logical low to a logical high) or whether the asymmetry is a low level asymmetry (e.g., an asymmetry when transitioning from a logical high to a logical low), in step 320, this determination is governs whether the DFE controller 292 generates a control signal transmitted to input 284 to select input 298 or input 300 of the selection circuit 296. For example, if the asymmetry is determined to be present with respect to the logical high level, the DFE controller 292 generates a control signal transmitted to input 284 to select input 298 of the selection circuit 296. Similarly, if the asymmetry is determined to be present with respect to the logical low level, the DFE controller 292 generates a control signal transmitted to input 284 to select input 300 of the selection circuit 296.

Additional steps may be undertaken with respect to the method 306, including, for example, once the determination of asymmetry is present in step 314 (in conjunction with step 320 or separate from step 320) a DFE offset value may be increased until an optimized DFE value is determined (e.g., arrow 322 ceases to increase). Likewise, thereafter, verification that boundaries of the eye 324 of the eye diagram 310 of FIG. 12 can be verified (e.g., left, right, and lower eye boundaries when the upper boundary is asymmetrical or left, right, and upper eye boundaries when the lower boundary is asymmetrical) to insure that selection of the DFE offset value hasn't degraded the boundary values.

Figure 12:
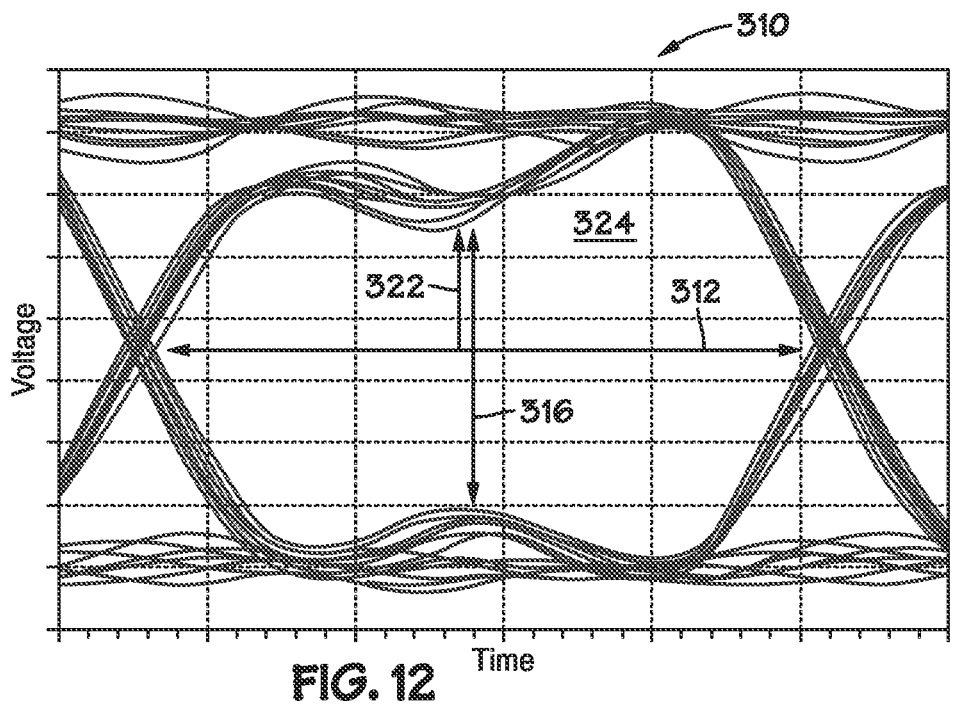
FIG. 12 illustrates an eye diagram generated for the method of training in FIG. 11, according to an embodiment of the present disclosure.

In this manner, as described above, method 306 allows for review of the shape of the eye 324 of the eye diagram 310 of FIG. 12 to determine whether there would be a benefit in utilizing the asymmetric DFE architecture (i.e., selection of one of inputs 298 or 300 in place of input 302) to change the decision feedback technique applied. Likewise, as described above, method 306 allows for review of the shape of the eye 324 of the eye diagram 310 of FIG. 12 to determine whether the selection of traditional DFE architecture (i.e., selection of input 302 in place of one of inputs 298 or 300) is preferable. It should be additionally noted that the techniques described above using decision feedback equalization can be applied not just to the memory device 10, but additionally in other locations, for example, on a non-memory side of a channel of the memory device 10 that receives data from the memory device 10 or in one or more electronic chips that utilize an N/N memory driver, a low-voltage source-terminated logic (LVSTL), or other N/N style drivers.

Figure 13:
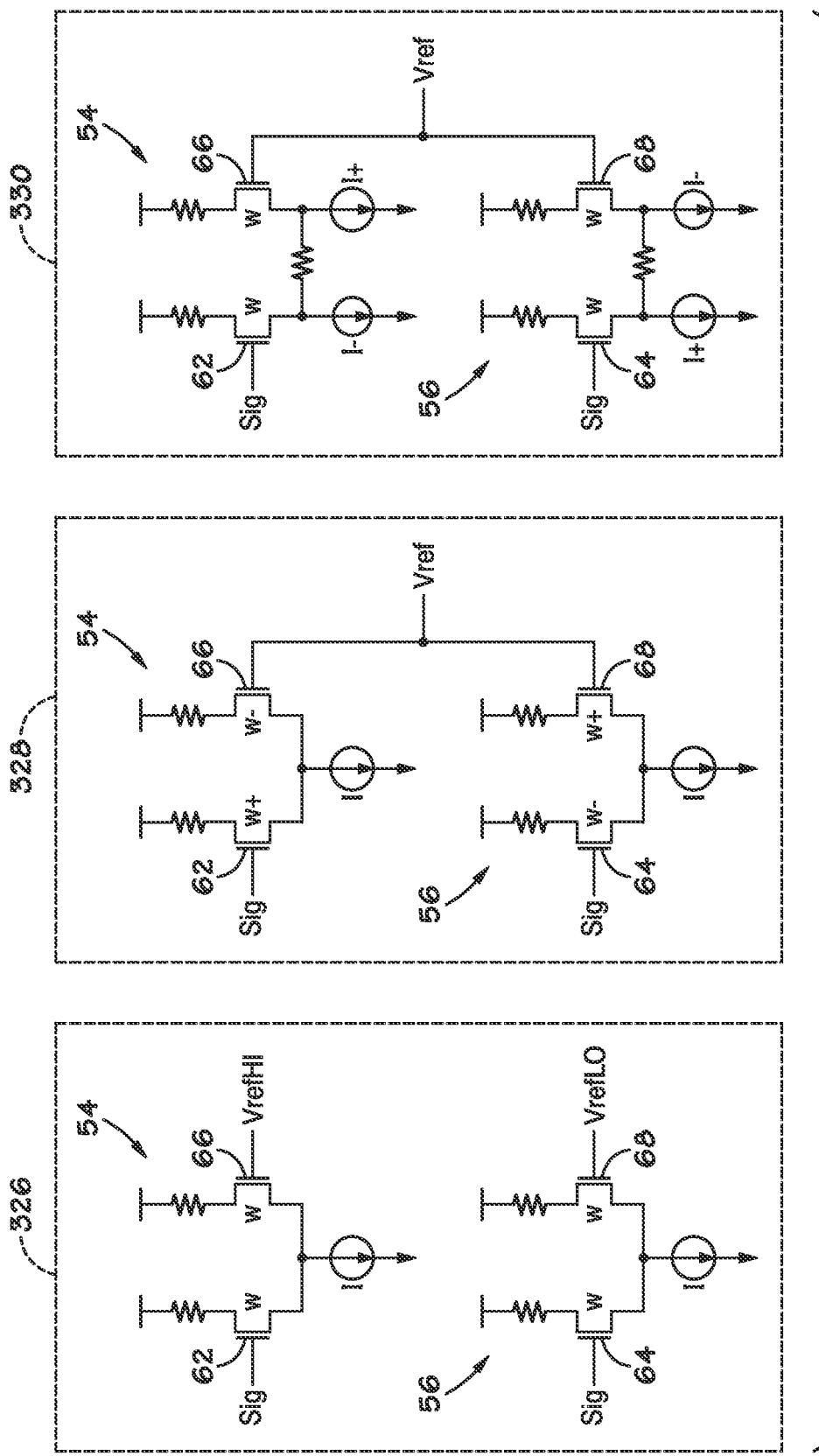
FIG. 13 illustrates a first set of receiver pairs of a decision feedback equalizer of the decision feedback equalizer circuitry of FIG. 2.
Figure 14:
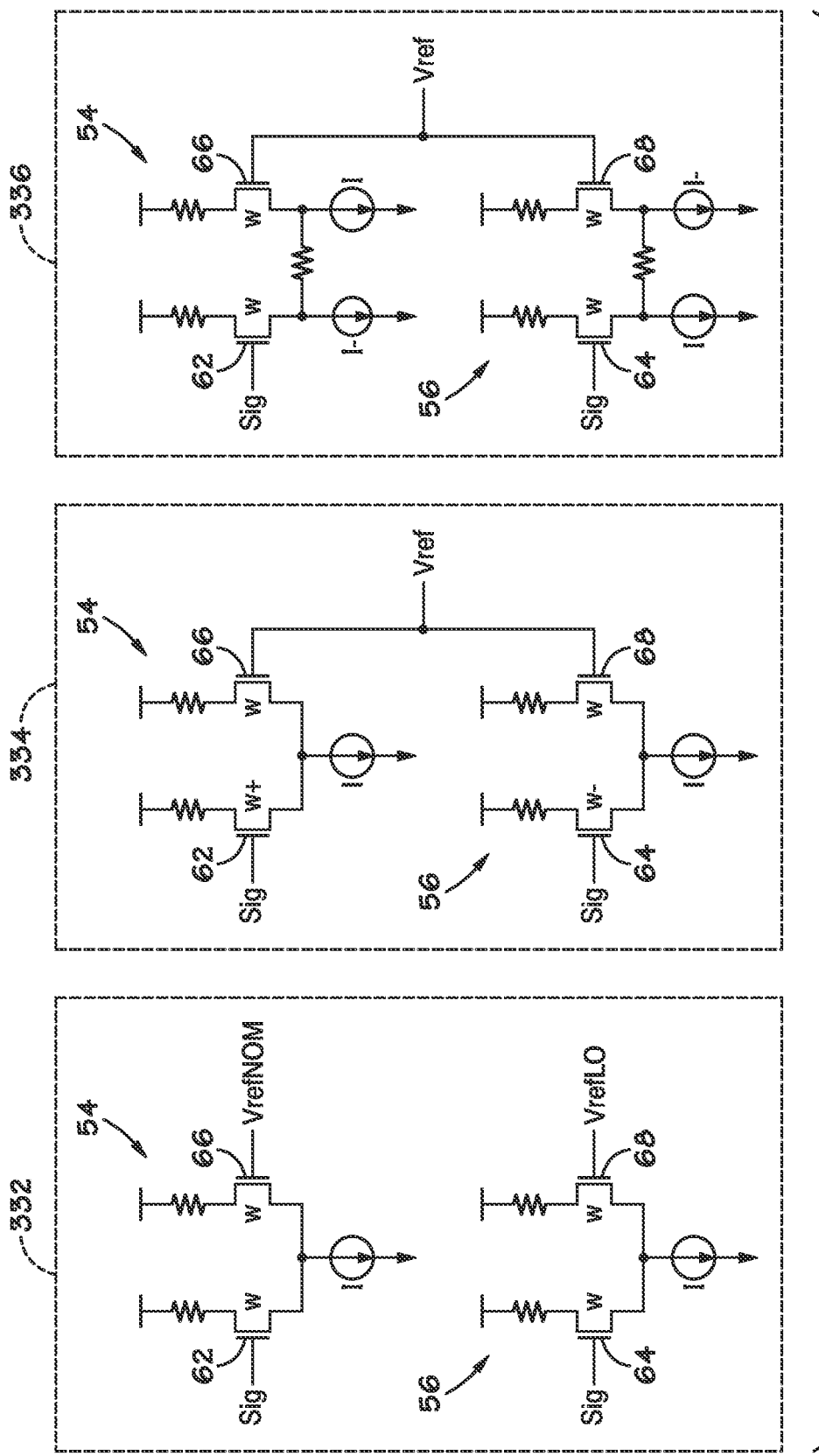
FIG. 14 illustrates a second set of receiver pairs of a decision feedback equalizer of the decision feedback equalizer circuitry of FIG. 2.

It should be noted that there are other embodiments for performing the asymmetric application of equalization including, for example, current sensing. FIGS. 13 and 14 illustrate examples of alternate topologies for, for example, the above described receivers (e.g., receiver 54 and receiver 56).

FIG. 13 illustrates receiver pair 326, receiver pair 328, and receiver pair 330. As illustrated, the receiver pair 326 includes, for example, receiver 54 and receiver 56 of FIG. 2, whereby the receiver 54 receives at input 62 the input bit (e.g., Din) and the receiver 56 receives Din. Similarly, receiver 54 receives a reference voltage (VrefHi) at input 66 while receiver 56 receives a reference voltage (VrefLo) at input 68. However, alternative techniques can be utilized, as illustrated in receiver pair 328 and receiver pair 330. For receiver pair 328 and receiver pair 330 (which can be substituted for receiver pair 326), the receiver 54 receives at input 62 Din and the receiver 56 receives Din. However, for receiver pair 328 and receiver pair 330, the receiver 54 and the receiver 56 each receive a common (i.e., the same) reference voltage Vref.

Similarly, FIG. 14, illustrates receiver pair 332, receiver pair 334, and receiver pair 336. As illustrated, the receiver pair 332 includes, for example, receiver 54 and receiver 56 of FIG. 7, whereby the receiver 54 receives at input 62 Din and the receiver 56 receives Din. Similarly, receiver 54 receives a reference voltage (VrefNom) having a voltage value higher than the reference voltage value of VrefLo, which is received at input 68. However, alternative techniques can be utilized, as illustrated in receiver pair 334 and receiver pair 336. For receiver pair 334 and receiver pair 336 (which can be substituted for receiver pair 332), the receiver 54 receives at input 62 Din and the receiver 56 receives Din. However, for receiver pair 328 and receiver pair 330, the receiver 54 and the receiver 56 each receive a common (i.e., the same) reference voltage Vref.

The common reference voltage Vref received in the receiver pairs 328, 330, 334, and 336 allows for a differential in which, instead of two voltages, steering currents down one side or the other of the receivers 54 and 56 are employed to skew the input differential pair by biasing one side of the receivers 54 and 56 or the other. In this manner, instead of skewing the voltages that are presented (e.g., VrefHi and VrefLo or VrefNom and VrefLo), a common reference voltage can be transmitted to each receiver 54 and 56. The differential pair of inputs in receiver pairs 328, 330, 334, and 336 can be skewed such that it provides results similar to those provided by receiver pairs 326 and 332 (i.e., the receiver pairs 328, 330, 334, and 336 operate as if they were provided 2 differential voltages). Thus, instead of calibrating each reference voltage independently (e.g., with respect to receiver pairs 326 and 332), calibration of the legs of the driver can be performed independently while maintaining single reference voltage Vref (e.g., providing an effective difference). Thus, instead of the receivers 54 and 56 of receiver pair 326 and 332 being biased at the front end (e.g., by shifting the DC level of the reference voltages VrefHi, VrefLo, and VrefNom), the receivers 54 and 56 of the receiver pairs 328, 330, 334, and 336 are biased by providing the same reference voltage Vref but skewing the inputs 62 and 64.

Likewise, in some embodiments, a reference voltage Vref may be placed in middle of nominal swing and swept up and down not by sweeping the voltage itself but by sweeping the mismatch between the two input transistors (e.g., the input transistor that the Vref is connected to and the input transistor that Din signal is connected to) for the receiver pairs 328, 330, 334, and 336. Offset of the reference voltage Vref may, for example, be provided from a reference voltage generator or by skewing the input pair of transistors, thus modifying the technique described above with respect to FIG. 12 for use with the receiver pairs 328, 330, 334, and 336 of FIGS. 13 and 14.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A device, comprising:
   a decision feedback decision feedback equalizer (DFE) circuitry that when in operation receives an input bit and generates a corrected bit corresponding to a second input bit that is received by the DFE circuitry prior to reception of the input bit, wherein the DFE circuitry comprises:
   a DFE, comprising:
      a first receiver that when in operation compares a voltage level of the input bit to a first reference voltage to generate a first result signal having a first logical level;
      a second receiver that when in operation compares the voltage level of the input bit to a second reference voltage to generate a second result signal having a second logical level;

a selection circuit comprising:
  a first input coupled to the first receiver to receive the first result signal;
  a second input coupled to the second receiver to receive the second result signal;
  an output that when in operation selectively transmits one of the first result signal and the second result signal; and
  a control input that when in operation receives a control signal to control selective transmission of one of the first result signal and the second result signal from the output; and
a control circuit coupled to the control input, wherein the control circuit when in operation generates the control signal based upon the first logical level of the first result signal and a third logical level of the corrected bit or the second logical level of the second result signal and the third logical level of the corrected bit.

2. The device of claim 1, wherein the control circuit comprises:
  a third input that when in operation receives the corrected bit;
  a fourth input that when in operation receives the first result signal;
  an inverter coupled to the third input;
  a NAND gate having a fifth input coupled to the inverter, a sixth input coupled to the fourth input; and
  a second output coupled to the NAND gate, wherein the second output when in operation transmits a signal generated by the NAND gate as the control signal.

3. The device of claim 2, wherein the DFE comprises a latch that when in operation receives the first result signal from the first receiver and delays transmission of the first result signal to the first input of the selection circuit and the fourth input of the control circuit.

4. The device of claim 1, wherein the control circuit comprises:
  a third input that when in operation receives the corrected bit;
  a fourth input that when in operation receives the second result signal;
  an inverter coupled to the fourth input;
  a NAND gate having a fifth input coupled to the third input, a sixth input coupled to the inverter; and
  a second output coupled to the NAND gate, wherein the second output when in operation transmits a signal generated by the NAND gate as the control signal.

5. The device of claim 4, wherein the DFE comprises a latch that when in operation receives the second result signal from the second receiver and delays transmission of the second result signal to the second input of the selection circuit and the fourth input of the control circuit.

6. The device of claim 1, wherein the first receiver compares the voltage level of the input bit to the first reference voltage at a rising edge of a clock signal, wherein the second receiver compares the voltage level of the input bit to the second reference voltage at the rising edge of the clock signal.

7. The device of claim 6, wherein the DFE comprises:
  a third receiver that when in operation compares a second voltage level of a second input bit to the first reference voltage to generate a third result signal having a fourth logical level;
  a fourth receiver that when in operation compares the second voltage level of the second input bit to the second reference voltage to generate a fourth result signal having a fifth logical level;
  a second selection circuit comprising:
    a third input coupled to the third receiver to receive the third result signal;
    a fourth input coupled to the fourth receiver to receive the fourth result signal;
    a second output that when in operation selectively transmits one of the third result signal and the fourth result signal; and
    a second control input that when in operation receives a second control signal to control selective transmission of one of the third result signal and the fourth result signal from the output; and
  a second control circuit coupled to the second control input, wherein the second control circuit when in operation generates the second control signal based upon the fourth logical level of the third result signal and a sixth logical level of a second corrected bit or the fifth logical level of the fourth result signal and the sixth logical level of the second corrected bit.

8. The device of claim 7, wherein the third receiver compares the second voltage level of the second input bit to the first reference voltage at a falling edge of the clock signal subsequent to the rising edge of the clock signal, wherein the fourth receiver compares the second voltage level of the second input bit to the second reference voltage at the falling edge of the clock signal.

9. The device of claim 1, wherein the control circuit comprises a second control input that when in operation receives a second control signal to control selection and transmission of the control signal as based upon the first logical level of the first result signal and the third logical level of the corrected bit.

10. The device of claim 9, wherein the second control input when in operation receives a third control signal to control selection and transmission of the control signal as based upon the second logical level of the second result signal and the third logical level of the corrected bit.

11. The device of claim 10, wherein the second control input when in operation receives a fourth to control selection and transmission of the control signal as based upon the third logical level of the corrected bit.

12. A device, comprising:
selection circuitry comprising:
  a first input that when in operation receives a first result signal having a first logical level generated based upon a comparison of a voltage level of an input bit to a first reference voltage;
  a second input that when in operation receives a second result signal having a second logical level generated based upon a comparison of the voltage level of the input bit to a second reference voltage;
  a third input that when in operation receives a corrected bit based at least in part on a second input bit that is received prior to reception of the input bit;
  a first control circuit coupled to the first input and the third input, wherein the first control circuit when in operation generates a first control signal;
  a second control circuit coupled to the second input and the third input, wherein the second control circuit when in operation generates a second control signal; and
  an output that when in operation selectively transmits one of the first control signal, the second control signal, and the corrected bit.

13. The device of claim 12, comprising a selection circuit coupled to the first input, the second input, the third input, and the output, wherein the selection circuit comprises a control input.

14. The device of claim 13, wherein the selection circuit when in operation transmits the first control signal to the output for selective transmission when a first signal is received at the control input.

15. The device of claim 13, wherein the selection circuit when in operation transmits the second control signal to the output for selective transmission when a second signal is received at the control input or transmits the corrected bit to the output for selective transmission when a third signal is received at the control input.

16. The device of claim 12, wherein the first control circuit comprises:
a NAND gate having a fourth input coupled to the third input and a fifth input coupled to the first input, wherein the NAND gate when in operation generates the first control signal based upon the first logical level of first result signal and an inverse value of a logical value of the corrected bit.

17. The device of claim 12, wherein the second control circuit comprises:
a NAND gate having a fourth input coupled to the second input and a fifth input coupled to the third input, wherein the NAND gate when in operation generates the second control signal based upon an inverse value of the second logical value of the second result signal and a logical value of the corrected bit.

18. A method, comprising:
sweeping a reference voltage signal across a set of voltages to find a center point of an eye diagram;
determining whether an asymmetry is present in the eye diagram relative to the center point of the eye diagram; and
when the asymmetry is determined to be present, generating a control signal to select a mode of operation of a decision feedback equalizer in which equalization to be applied to an input data bit is disabled.

19. The method of claim 18, wherein determining whether the asymmetry is present in the eye diagram relative to the center point of the eye diagram comprises determining whether the asymmetry corresponds to a high level asymmetry or whether the asymmetry corresponds to a low level asymmetry.

20. The method of claim 19, wherein generating the control signal to select the mode of operation of the decision feedback equalizer comprises generating the control signal as having a first value to select the mode of operation of the decision feedback equalizer when the asymmetry corresponds to the high level asymmetry.

21. The method of claim 20, wherein generating the control signal to select the mode of operation of the decision feedback equalizer comprises generating the control signal as having a second value to select the mode of operation of the decision feedback equalizer when the asymmetry corresponds to the low level asymmetry.

22. The method of claim 21, comprising when the asymmetry is determined not to be present, generating the control signal as having a third value to select a second mode of operation of a decision feedback equalizer in which equalization to be applied to the input data bit is enabled.

23. The method of claim 18, wherein determining whether the asymmetry is present in the eye diagram relative to the center point of the eye diagram comprises sweeping voltages above and below the center point of the eye diagram.

* * * * *

UNITED STATES PATENT AND TRADEMARK OFFICE
CERTIFICATE OF CORRECTION

PATENT NO. : 11,804,992 B2
APPLICATION NO. : 17/225602
DATED : October 31, 2023
INVENTOR(S) : Timothy M. Hollis It is certified that error appears in the above-identified patent and that said Letters Patent is hereby corrected as shown below:

On the Title Page

Item (54) and in the Specification Lines 1-2, Column 1 in the title, please delete "ASYMETRIC DECISION FEEDBACK EQUALIZATION" and insert --ASYMMETRIC DECISION FEEDBACK EQUALIZATION--, therefor.

In the Claims

In Column 32, Line 53 (Claim 1), please delete "a decision feedback decision feedback" and insert --a decision feedback--, therefor.

In Column 34, Line 43 (Claim 11), please delete "a fourth" and insert --a fourth control signal--, therefor.

In Column 35, Line 21 (Claim 16), please delete "first result signal" and insert --the first result signal--, therefor.

Signed and Sealed this
Nineteenth Day of March, 2024

Katherine Kelly Vidal
*Director of the United States Patent and Trademark Office*